(12) United States Patent
Cho et al.

(10) Patent No.: US 7,883,231 B2
(45) Date of Patent: Feb. 8, 2011

(54) BACKLIGHT ASSEMBLY

(75) Inventors: Joo-Woan Cho, Asan-si (KR);
Seong-sik Choi, Seoul (KR); Du-hwan Chung, Suwon-si (KR); Cheol-yong Noh, Asan-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 181 days.

(21) Appl. No.: 12/152,579

(22) Filed: May 15, 2008

(65) Prior Publication Data

US 2008/0316739 A1    Dec. 25, 2008

(30) Foreign Application Priority Data

Jun. 22, 2007    (KR) ..................... 10-2007-0061686

(51) Int. Cl.
    *G09F 13/04*    (2006.01)
    *G09F 13/08*    (2006.01)
    *F21V 7/04*    (2006.01)
    *F21V 21/00*    (2006.01)

(52) U.S. Cl. ................. 362/97.1; 362/634; 362/217.01

(58) Field of Classification Search ............... 362/630, 362/634, 97.1, 97.2, 217.17, 221, 225, 217.01, 362/217.1; 349/70; 439/375, 226, 241, 232, 439/237

See application file for complete search history.

(56) References Cited

U.S. PATENT DOCUMENTS

| | | | |
|---|---|---|---|
| 6,309,236 B1 * | 10/2001 | Ullrich | 439/226 |
| 7,059,888 B2 * | 6/2006 | Frappier et al. | 439/375 |
| 7,347,705 B1 * | 3/2008 | Huang et al. | 439/231 |
| 7,399,190 B2 * | 7/2008 | Ohmori | 439/226 |
| 7,527,510 B2 * | 5/2009 | Yoo | 439/232 |
| 7,530,829 B2 * | 5/2009 | Yuan et al. | 439/232 |
| 2006/0279957 A1 | 12/2006 | Kwon et al. | |
| 2007/0037427 A1 * | 2/2007 | Miyazono | 439/232 |
| 2008/0084696 A1 * | 4/2008 | Yang et al. | 362/249 |
| 2008/0106900 A1 * | 5/2008 | Chang et al. | 362/249 |

FOREIGN PATENT DOCUMENTS

| | | |
|---|---|---|
| EP | 1 760 846 | 3/2007 |
| KR | 10-0643526 | 11/2006 |
| WO | WO 2007/041127 | 4/2007 |

OTHER PUBLICATIONS

Korean Patent Abstracts, Publication No. 100643526, Nov. 1, 2006, 1 p.

* cited by examiner

*Primary Examiner*—Jong-Suk (James) Lee
*Assistant Examiner*—David R Crowe
(74) *Attorney, Agent, or Firm*—Innovation Counsel LLP

(57) ABSTRACT

Provided is a backlight assembly which includes integral power supply sockets and ground sockets, in which the number of parts is reduced in addition to the manufacturing cost. The backlight assembly includes a lamp including a lamp tube and an electrode that protrudes beyond either end of the lamp tube, a power supply socket including a first plate that has a first guide groove through which the electrode is inserted and a plate spring that is disposed on one side of the first plate and fixes the electrode in the first guide groove by pressurizing the electrode, and a bottom chassis containing the lamp and the power supply socket therein, in which the first plate and the plate spring are formed of a conductive material.

20 Claims, 27 Drawing Sheets

BACKLIGHT ASSEMBLY

RELATED APPLICATIONS

This application claims priority from Korean Patent Application No. 10-2007-0061686 filed on Jun. 22, 2007 in the Korean Intellectual Property Office, the disclosure of which is incorporated herein by reference in its entirety.

BACKGROUND

1. Technical Field

The present invention relates to a backlight assembly, and, more particularly, to a backlight assembly having a reduced number of parts for easy assembly.

2. Related Art

Liquid crystal displays (LCDs) are commonly used examples of flat panel displays (FPDs). Generally, LCDs include two panels having a plurality of electrodes and a liquid crystal layer interposed between the panels. LCDs adjust the amount of light that is transmitted through the liquid crystal layer by applying voltages to the electrodes so that liquid crystal molecules in the liquid crystal layer can be rearranged.

Typically, LCDs include a backlight assembly which provides light that is transmitted through a liquid crystal layer. A backlight assembly includes a plurality of lamps, a plurality of sockets, and a bottom chassis.

Conventionally, a socket, which is used to house and fix the lamp onto the bottom chassis, has a plurality of parts. In the manufacture of a conventional LCD having an array of lamps, an alignment plate is additionally needed to fix a plurality of sockets which are respectively connected to the lamps on the bottom chassis. In this case, in order to assemble a backlight assembly, the alignment plate is fixed onto the bottom surface of the bottom chassis, the bottom chassis is turned upside down, and then the sockets and the lamps are fixed to the alignment plate.

However, since the sockets include a plurality of parts, it is somewhat time consuming and costly to assemble the sockets. Further, it takes a long time to assemble a backlight assembly due to the number of processes required to fix the alignment plate to the bottom chassis and to fix a plurality of sockets and lamps onto the alignment plate. Moreover, lamps are highly likely to be either detached from the sockets or damaged when an external shock is applied.

Thus, there is a need for a backlight assembly having an improved structural design that provides a reduced manufacturing time.

SUMMARY

To overcome the deficiencies of conventional backlight assemblies, embodiments of the present invention provide a backlight assembly having a reduced number of parts and a reduced manufacturing time.

However, embodiments of the present invention should not restricted to those set forth herein, and embodiments of the present invention will become apparent to one of skill in the art to which the present invention pertains by referencing the detailed description of the present invention given below.

According to an embodiment of the present invention, a backlight assembly is provided having a lamp which includes a lamp tube and an electrode that protrudes beyond either end of the lamp tube, a power supply socket which includes a first plate that has a first guide groove through which the electrode is inserted, and a plate spring that is disposed on one side of the first plate and fixes the electrode in the first guide groove by pressurizing the electrode, and a bottom chassis which contains the lamp and the power supply socket therein. In one aspect, the first plate and the plate spring are formed of a conductive material.

According to another embodiment of the present invention, a backlight assembly is provided having a lamp which includes a lamp tube and an electrode that protrudes beyond either end of the lamp tube, a power supply socket which includes a first plate spring that pressurizes the electrode in a first direction and a second plate spring that pressurizes the electrode in a second direction opposite to the first direction, and a bottom chassis which contains the lamp and the power supply socket therein. In one aspect, the first and second plate springs are formed of a conductive material and at least one of the first and second plate springs includes a guide groove into which the electrode is inserted.

According to another embodiment of the present invention, a backlight assembly is provided having a lamp which includes a lamp tube and an electrode that protrudes beyond either end of the lamp tube, a ground socket which includes a first plate that has a first guide groove into which the lamp is inserted, and a plate spring which is disposed on one side of the first plate corresponding to the first guide groove and fixes the electrode in the first guide groove by pressurizing the electrode, and a bottom chassis which contains the lamp and the ground socket therein. In one aspect, the first plate and the plate spring are formed of a conductive material.

BRIEF DESCRIPTION OF THE DRAWINGS

The above and other aspects and features of the present invention will become apparent by describing in detail exemplary embodiments thereof with reference to the attached drawings, in which.

DETAILED DESCRIPTION

Figure 1:
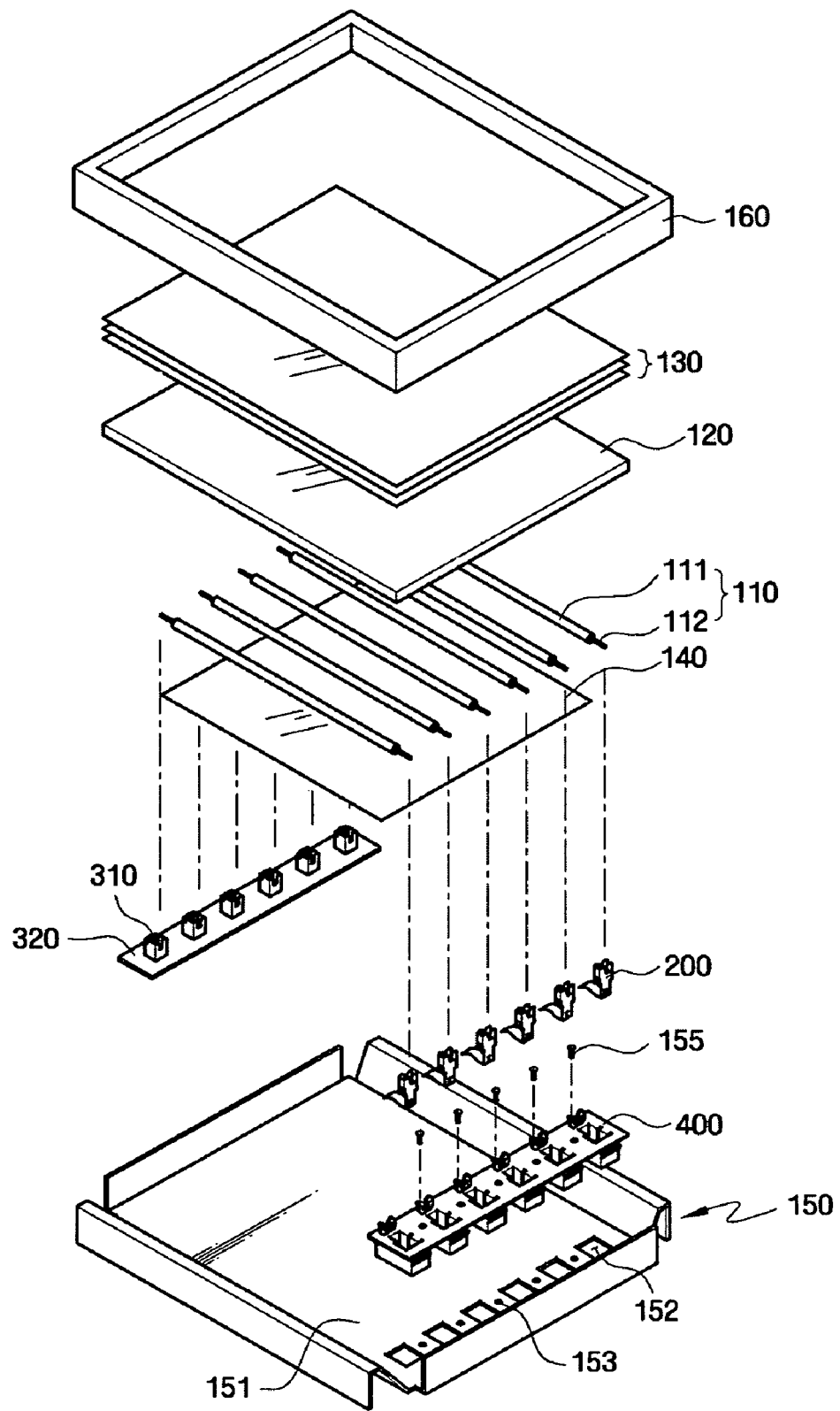
FIG. 1 is an exploded perspective view of a backlight assembly according to an embodiment of the present invention.

The present invention will now be described in reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough, complete, and convey the concept of the invention to those skilled in the art.

Hereinafter, exemplary embodiments of the present invention will be described in detail with reference to the drawings. Like reference numerals in the drawings denote like elements.

A backlight assembly according to an embodiment of the present invention will hereinafter be described in detail with reference to FIG. 1. As indicated above, FIG. 1 is an exploded perspective view of a backlight assembly according to an embodiment of the present invention.

Referring to FIG. 1, the backlight assembly includes a plurality of lamps 110, a diffusion plate 120, a plurality of optical sheets 130, a reflective sheet 140, a bottom chassis 150, a middle mold 160, a plurality of power supply sockets 200, a plurality of ground sockets 310, a ground-socket alignment plate 320, and an alignment plate 400.

In one embodiment, cold cathode fluorescent lamps (CCFLs) or external electrode fluorescent lamps (EEFLS) may be used as the lamps 110. The lamps 110 generate light using a lamp-driving voltage applied thereto from an external source. The lamps 110 are evenly spaced, and connected in parallel. The lamps 110 may be direct-type lamps.

In one implementation, each of the lamps 110 includes a lamp tube 110 which encapsulates a discharge gas and an electrode 112 which protrudes beyond either end of the lamp tub 110 and to which a power supply voltage is applied from an external source. In order to obtain a uniform discharge gas distribution and thus obtain uniform luminance, the lamps 110 may be arranged in parallel with the longer side of the bottom chassis 150. First ends of the lamps 110 are respectively inserted into and thus fixed to the power supply sockets 200 which are fixed onto the alignment plate 400. Second ends of the lamps 110 are respectively inserted into and thus fixed to the ground sockets 310 which are disposed on the ground-socket alignment plate 320.

In one embodiment, the diffusion plate 120 is disposed on the lamps 110. The diffusion plate 120 improves the luminance of light incident from the lamps 110 and the luminance uniformity of the lamps 110.

In one embodiment, the optical sheets 130 are disposed on the diffusion plate 120. The optical sheets 130 diffuse or collect light incident from the lamps 110. The optical sheets 130 may include a diffusion sheet, a first prism sheet and a second prism sheet.

In one implementation, the first prism sheet is disposed on the diffusion sheet. A plurality of prism patterns (not shown) is uniformly formed as triangular prisms on one surface of the first prism sheet. The prism patterns on the first prism sheet collect light diffused by the diffusion sheet and emit the collected light. The second prism is disposed on the first prism sheet. The second prism sheet is a multilayered-reflective polarization prism sheet which collects, polarizes, and then emits light. The second prism sheet may be optional if a sufficient luminance and viewing angle can be secured only using the first prism sheet.

In one embodiment, the reflective sheet 140 is disposed below the lamps 110 and reflects light emitted downward from the lamps 110. The reflective sheet 140 may include a highly reflective material in order to minimize loss of light emitted from the lamps 110.

In one embodiment, the bottom chassis 150 contains the lamps 110, the diffusion plate 120, the optical sheets 130, the reflective sheet 140, the power supply sockets 200, and the alignment plate 400 therein.

In one implementation, the bottom chassis 150 includes a bottom plate 151 and a plurality of sidewalls which surround the bottom plate 151. The sidewalls include a pair of first sidewalls which are formed in parallel with the longitudinal direction of the bottom plate 151, and a pair of second sidewalls which are formed in parallel with the latitudinal direction of the bottom plate 151. A plurality of openings 152 for the alignment plate 400 are formed on one side of the bottom plate in parallel with the latitudinal direction of the bottom chassis 150. The alignment plate 400 is inserted into the bottom plate 151 through the openings 152. As many openings 152 as there are power supply sockets 200 may be formed. For example, a total of 16 openings 152 may be formed. The ground-socket alignment plate 320 and the ground sockets 310 are disposed on the other side of the bottom plate 151.

In one implementation, the first sidewalls may have a slanted lateral surface in order to prevent loss of light emitted from the lamps 110 toward the lateral sides of the bottom chassis 150, and the slanted lateral surfaces of the first sidewalls may be coated with a reflective material in order to improve the reflection of light emitted from the lamps 110. In another implementation, each of the first sidewalls may have a bent portion so as to properly support the middle mold 160 or to be coupled to a top chassis (not shown). In contrast, the second walls are perpendicular to the bottom chassis 150 and have no bent portion. Referring to FIG. 1, reference numeral 153 indicates bottom chassis tightening element insertion grooves.

Figure 2:
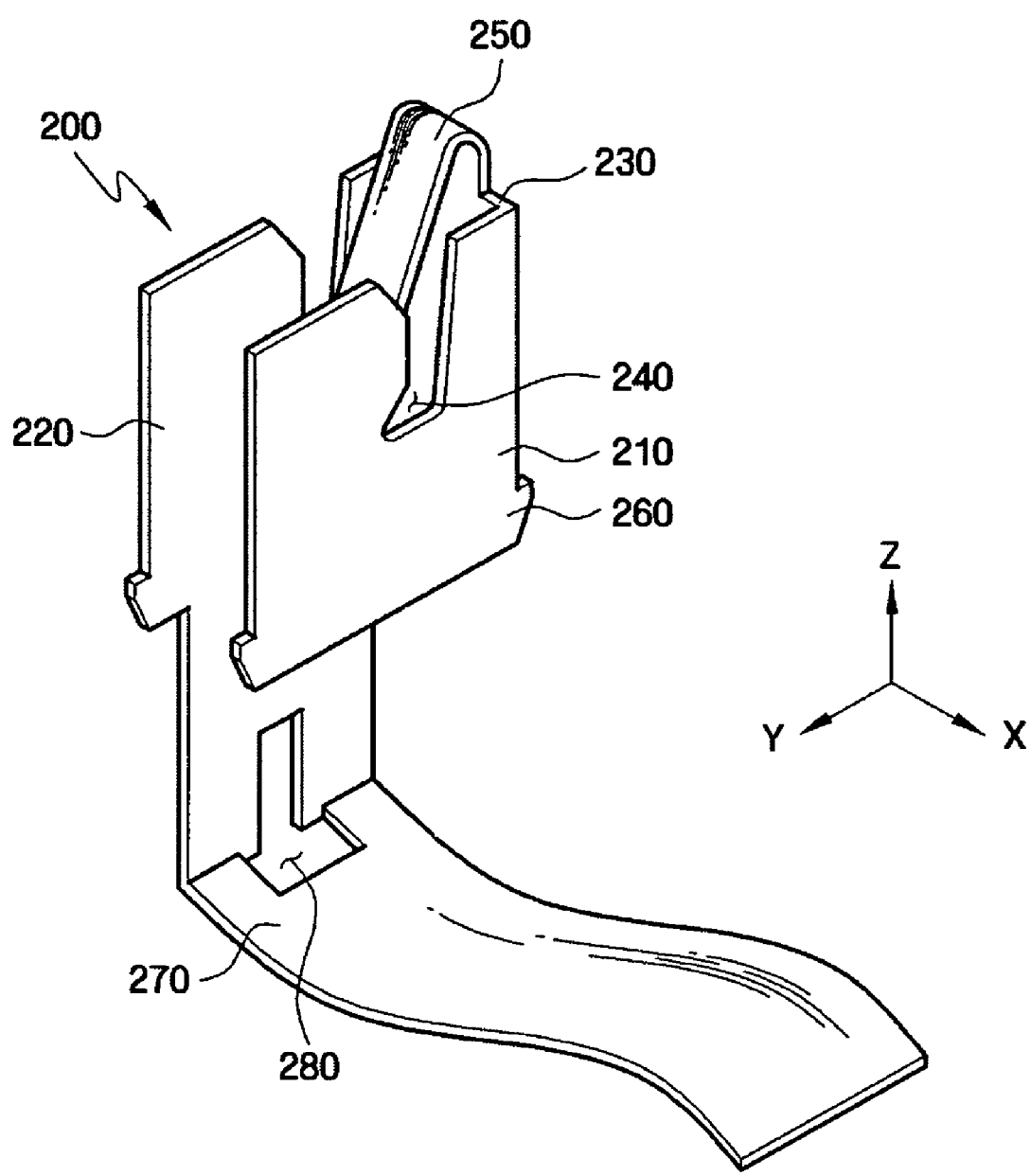
FIG. 2 is a perspective view of the power supply socket as shown in FIG. 1.
Figure 3A:
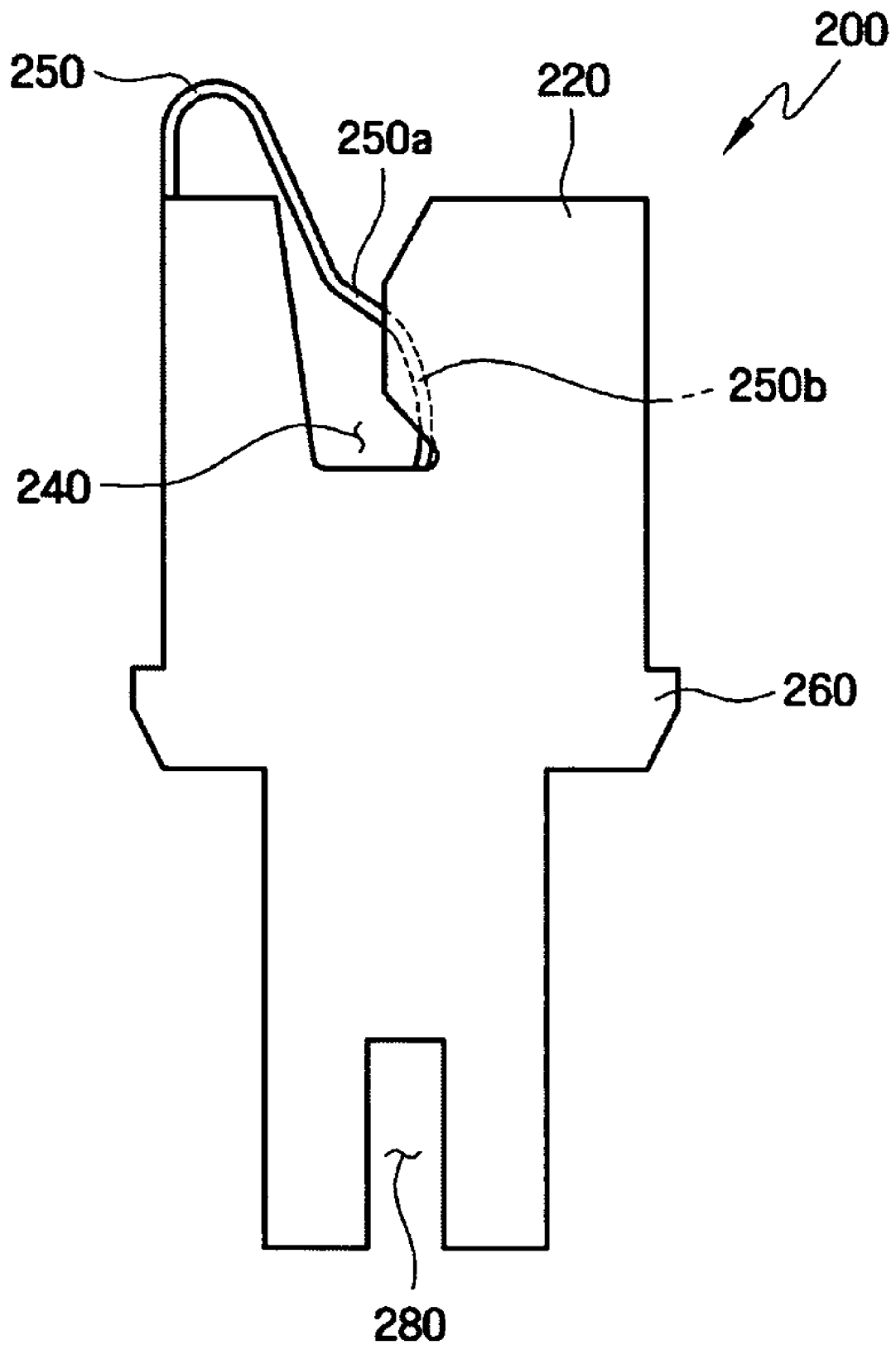
FIG. 3A is a bottom view of the power supply socket as shown in FIG. 2, as seen from the −x-direction.
Figure 3B:
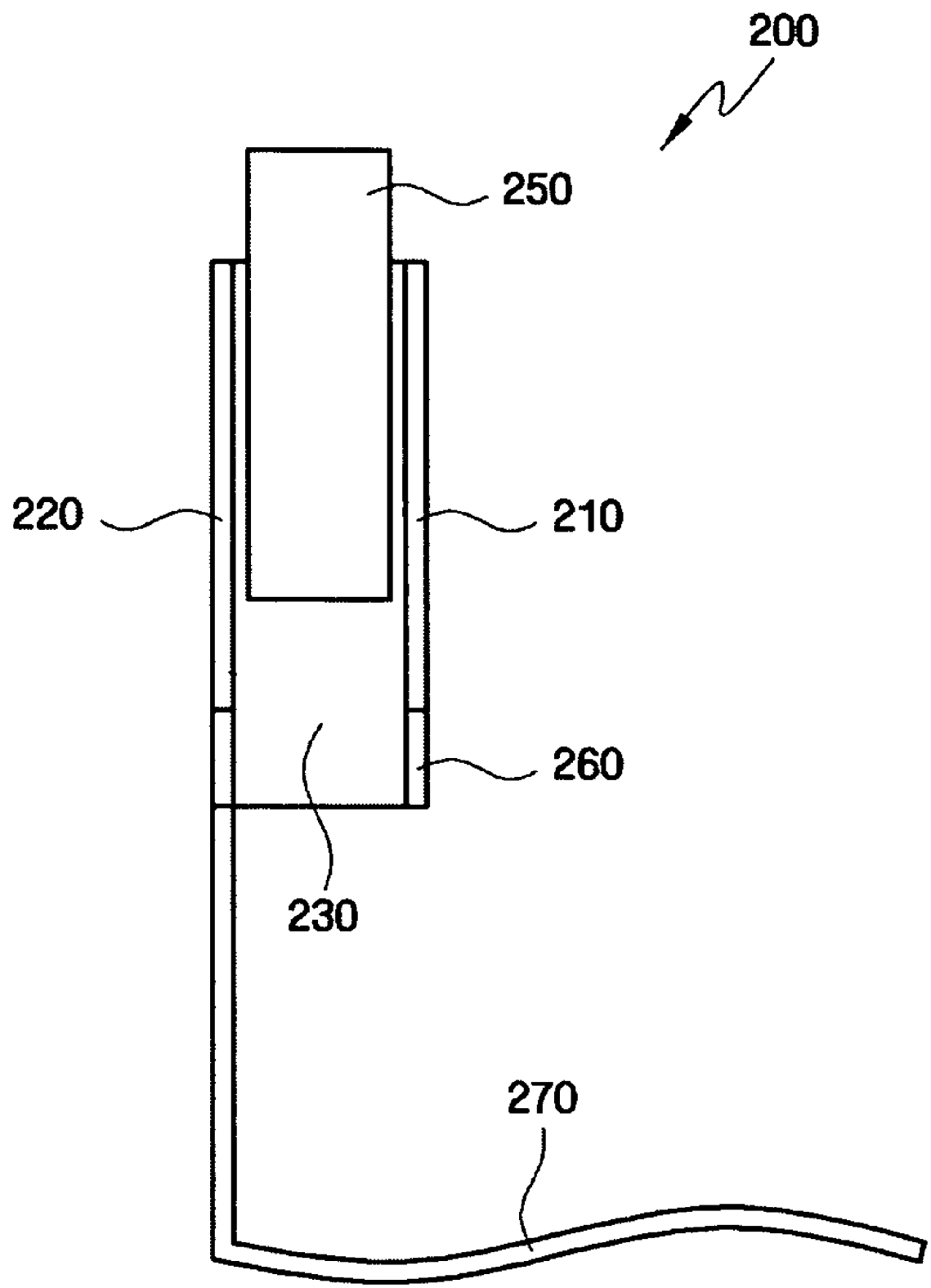
FIG. 3B is a side view of the power supply socket as shown in FIG. 2, as seen from the y-direction.
Figure 3C:
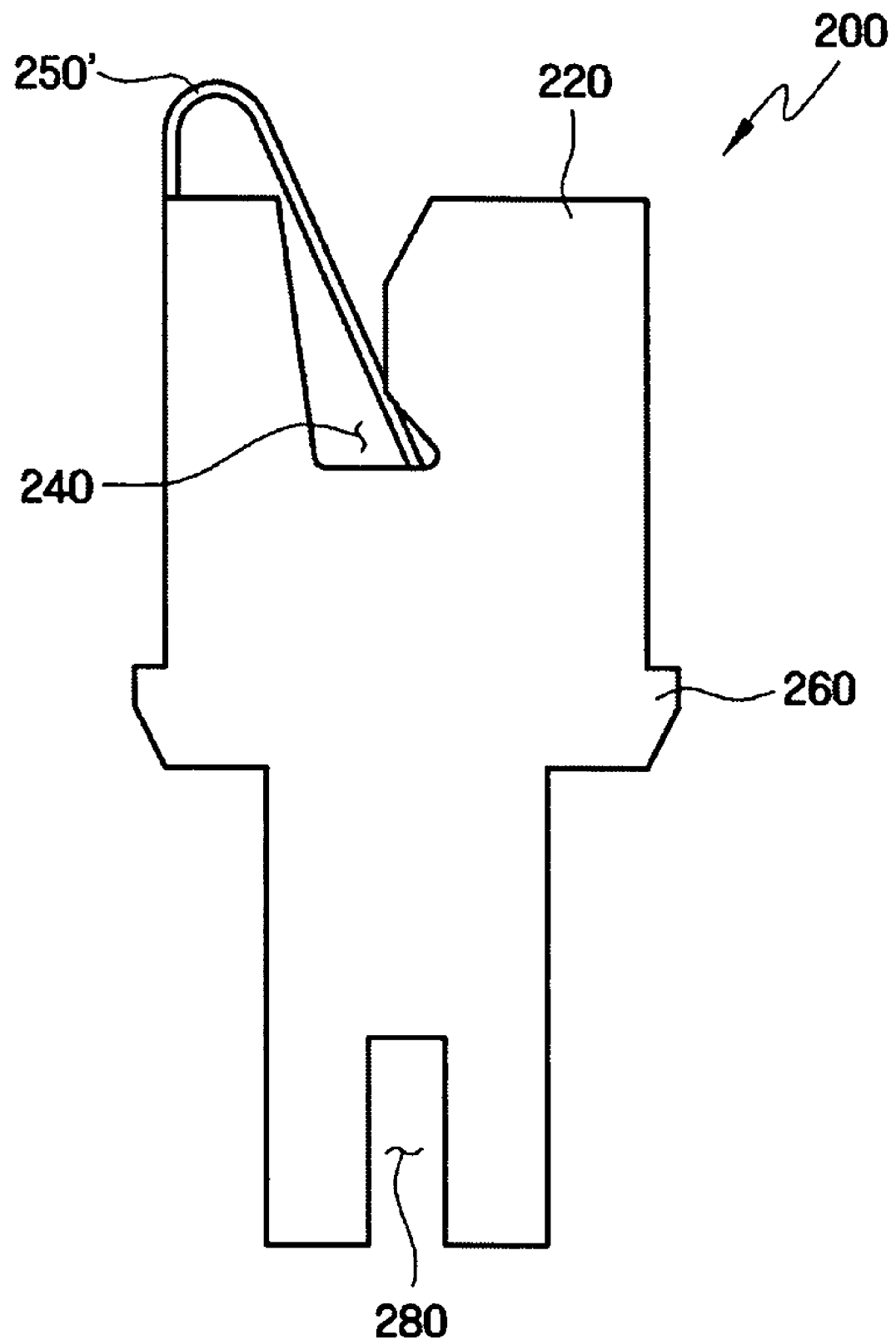
FIG. 3C is a bottom view of an embodiment of the power supply socket as shown in FIG. 2, as seen from the −x-direction.

The power supply sockets 200 as shown in FIG. 1 will hereinafter be described in further detail with reference to FIGS. 1 through 3C. FIG. 2 is a perspective view of a power supply socket 200 as shown in FIG. 1, FIG. 3A is a bottom view of the power supply socket 200 as shown in FIG. 2, as seen from an −x-direction, and FIG. 3B is a side view of the power supply socket 200 as shown in FIG. 2, as seen from an y-direction, and FIG. 3C is a bottom view of an embodiment of the power supply socket 200 as shown in FIG. 2, as seen from an −x-direction.

In one embodiment, referring to FIG. 1, the lamps 111 are fixed to the power supply sockets 200, and a power supply voltage is applied to the power supply sockets 200 from an external source. The power supply sockets 200 are inserted into the alignment plate 400, and the alignment plate 400 is contained in the bottom chassis 150.

In one embodiment, referring to FIGS. 1 through 3A, a power supply socket 200 includes a first guide groove 240 which is formed through a first plate 220 and a plate spring 250. An electrode 112 may be fixed in the first guide groove 240 by an external force applied thereto by the plate spring 250.

Specifically, in one embodiment, referring to FIG. 2, the power supply socket 200 includes the first plate 220 and a second plate 210 which face each other and a third plate 230 which connects the first plate 220 and the second plate 210. The first plate 220, the second plate 210, and the third plate 230 may be formed of a conductive material such as a metal as one body. The power supply socket 200 may be formed of a metal such as phosphor bronze. When the power supply socket 200 is formed of a metal, heat generated by the lamps 112 can be efficiently conducted into the air, thereby reducing the temperature of a backlight assembly and the temperature of a liquid crystal display (LCD) including the backlight assembly. In particular, when the power supply socket 200 is formed of phosphor bronze, it is possible to provide a backlight assembly with excellent workability and mechanical strength at lower cost. Since the first plate 220, the second plate 210, and the third plate 230 of the power supply socket 200 are incorporated into one body, it is possible to considerably reduce the manufacturing cost of a backlight assembly compared to when the first plate 220, the second plate 210, and the third plate 230 of the power supply socket 200 are not incorporated. The first guide groove 240 is formed through the first plate 220. The first plate 220 is disposed along an yz-plane, and the lamps 110 extend in an x-direction. The first plate 220 may have a thickness in the range of 0.2-0.3 mm.

In one embodiment, the first guide groove 240 is formed by cutting the first plate 220 along a direction from the top to the bottom of the first plate 220. Specifically, the first guide groove 240 has an opening at the top of the first plate 220, and includes a vertical portion which extends substantially downward from the opening and an inner portion which extends horizontally from the vertical portion. That is, the first guide groove 240 may be L-shaped. Alternatively, the first guide groove 240 may be T-shaped. However, the shape of the first guide groove 240 is not restricted to those set forth herein. That is, the first guide groove 240 may have a shape, other than an L-shape or a T-shape, as long as an electrode 112 can be inserted into and then fixed in the first guide groove 240 by being in contact with the inner portion of the first guide groove 240. In order to facilitate the insertion of an electrode 112 into the first guide groove 240 and help the electrode 112 to be firmly fixed in the first guide groove 240, the first guide groove 240 may become narrower from the opening to the inner portion of the first guide groove 240. The second plate 210 is disposed to face the first plate 220. A second guide groove, 240 which is formed through the second plate 210, overlaps the first guide groove 240. The first plate 220 has an extended portion which extends downward beyond the bottom of the second plate 210 and protrudes beyond the bottom of the bottom chassis 150. The first plate 220 and the second plate 210 are connected to the third plate 230. The first plate 220, the second plate 210, and the third plate 230 may be incorporated into one body.

Referring to FIGS. 2, 3A, and 3C, the third plate 230 perpendicularly intersects the first plate 220 and the second plate 210, and the plate spring 250 extends from the third plate 230. In one embodiment, the plate spring 250 protrudes toward the first guide groove 240 and the second guide groove 240. The plate spring 250 applies an external force to an electrode 112 and thus places the electrode 112 in contact with the first guide groove 240 and the second guide groove 240 so that the electrode 112 can be fixed in the first guide groove 240 and the second guide groove 240. Referring to FIGS. 2 and 3A, the plate spring 250 may have a concave surface 250a and a convex surface 250b. Alternatively, the plate spring 250 may be a flat plate having neither a concave surface nor a convex surface, as indicated by a plate spring 250' as shown in FIG. 3C. For clarity, assume that the plate spring 250 has both the concave surface 250a and the convex surface 250b. The concave surface 250a is disposed at a location corresponding to the opening of the first or second guide groove 240 and can thus facilitate the insertion of an electrode 112 into the power supply socket 200. The convex surface 250b is disposed at a location corresponding to the inner portion of the first or second guide groove 240. The convex surface 250b applies an external force to an electrode 112 so that the electrode 112 can firmly contact the ends of the inner portions of the first and second guide grooves 240 and the plate spring 250 and can be firmly fixed in the first and second guide grooves 240. In order to firmly couple the power supply socket 200 to the alignment plate 400, a plurality of power-supply-socket coupling protrusions 260 may be formed at lower portions of the first, second, and third plates 220, 210, and 230. In one implementation, in order to firmly fix the power supply socket 200 to the alignment plate 400, a power supply socket fixing groove 280 may be formed at the connection between the extended portion of the first plate 220 and an inverter guide plate 270.

Referring to FIGS. 2 and 3B, the power supply socket 200 may also include the inverter guide plate 270 which extends from the first plate 220 and substantially perpendicularly intersects the extended portion of the first plate 220. In one embodiment, the inverter guide plate 270 is electrically connected to an inverter (500 of FIG. 8) at the bottom of the bottom chassis 150. The inverter guide plate 270 has a curved surface which helps the inverter guide plate 270 to be placed in firm contact with an inverter power supply (520 of FIG. 8).

Figure 4:
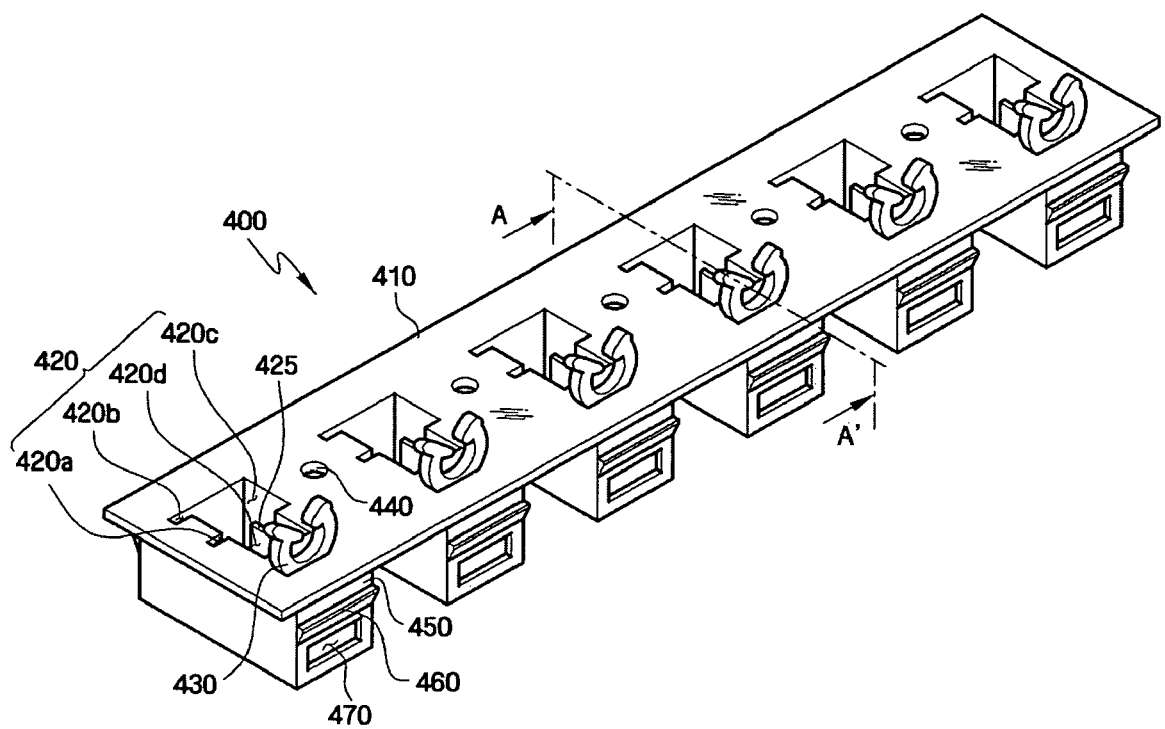
FIG. 4 is a perspective view of the alignment plate as shown in FIG. 1.
Figure 5:
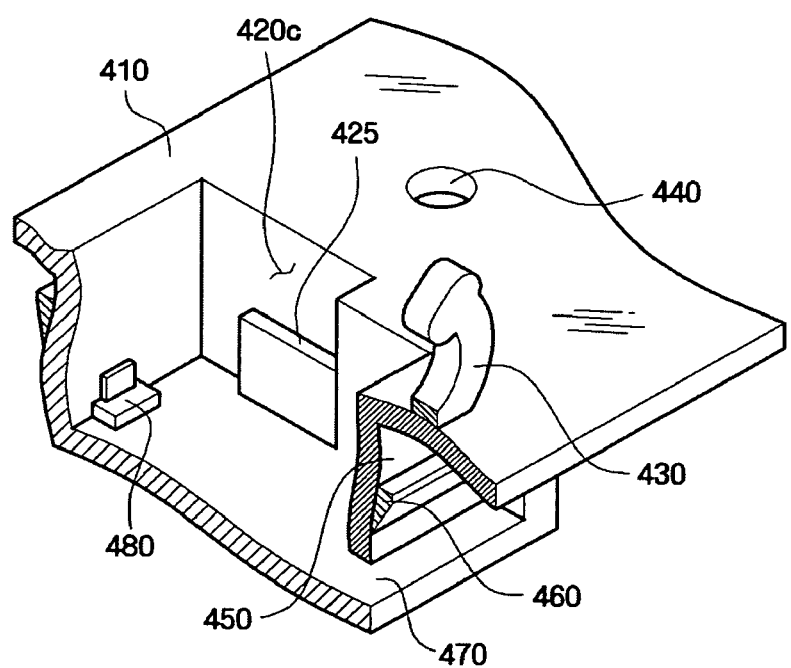
FIG. 5 is a cutout perspective view of the alignment plate as shown in FIG. 4, taken along line A-A' of FIG. 4.

In one embodiment, the alignment plate 400 as shown in FIG. 1 will hereinafter be described in further detail with reference to FIGS. 1 and 4 through 6. FIG. 4 is a perspective view of the alignment plate 400 as shown in FIG. 1, FIG. 5 is an exploded perspective view taken along line A-A' of FIG. 4, FIG. 6 is a perspective view of the connection between the power supply socket 200 as shown in FIG. 2, the alignment plate 400 as shown in FIG. 4, a plurality of lamps 110, and a bottom chassis 150.

Referring to FIGS. 1 and 4, the alignment plate 400 guides the power supply sockets 200 and fixes the power supply sockets 200 thereto. In one embodiment, the alignment plate 400 is coupled and fixed to the bottom chassis 150. For this, the bottom plate 151 includes the openings 152 for the alignment plate 400 so that the alignment plate 400 can be inserted into the bottom plate 151.

In one implementation, the alignment plate 400 includes an upper plate 410 which is disposed on the bottom plate 151, and a plurality of housings 450 which protrudes downward from the upper plate 410. The housings 450 are respectively inserted into the openings 152 of the bottom chassis 150 so that the housings 450 can protrude beyond the bottom plate 151 of the bottom chassis 150.

Figure 6:
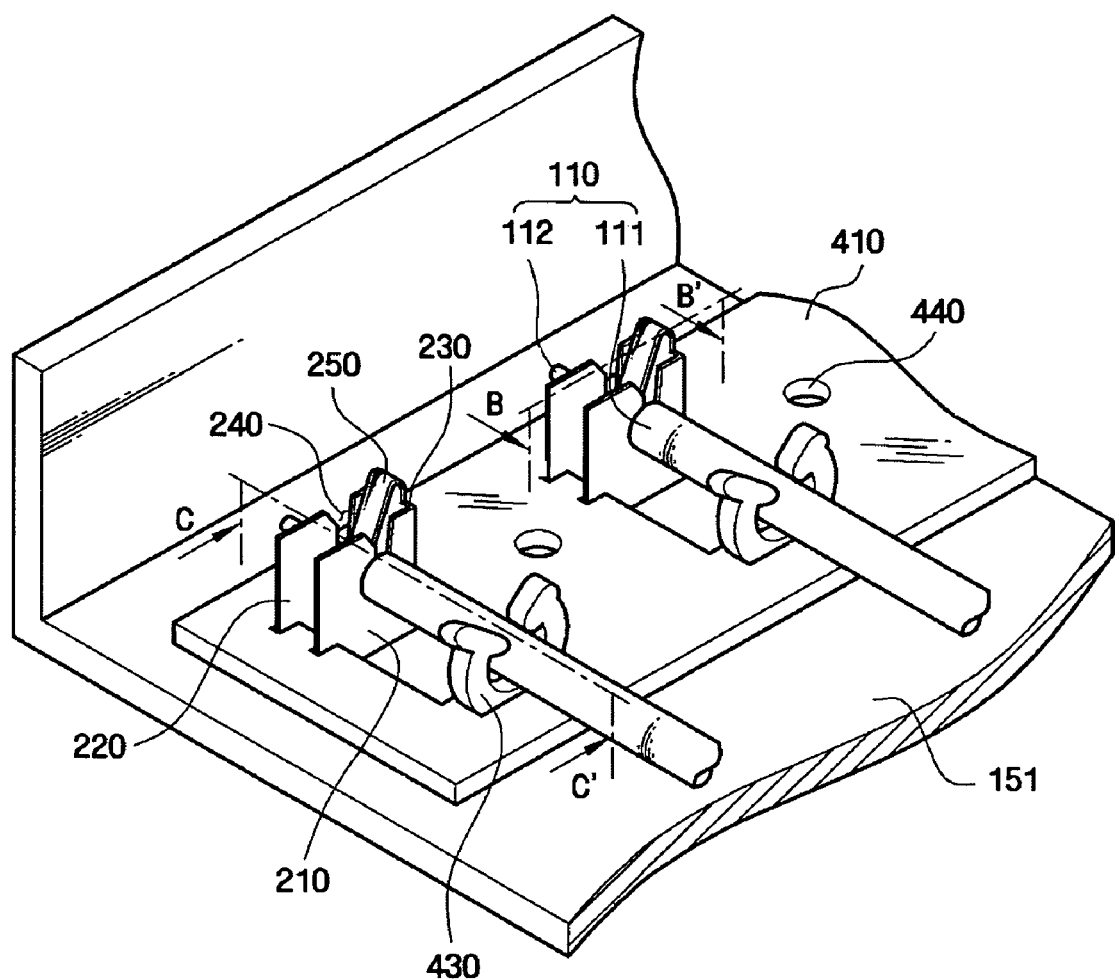
FIG. 6 is a perspective view showing the connection between the power supply socket as shown in FIG. 2, the alignment plate as shown in FIG. 4, a plurality of lamps, and a bottom chassis.

In one embodiment, referring to FIGS. 1, 4, and 6, the upper plate 410 of the alignment plate 400 may be rectangular, and extend in parallel with the latitudinal direction of the bottom plate 151. A plurality of power-supply-socket insertion grooves 420 are formed through the upper plate 410 so that the power supply sockets 200 can be respectively inserted into the power-supply-socket insertion grooves 420. As many power-supply-socket insertion grooves as there are housings may be provided. Also, a plurality of lamp tube holders 430 are formed on the upper plate 410. The lamp tube holders 430 respectively support the lamp tubes 111 of the lamps 110. When the power supply sockets 200 are respectively inserted into the power-supply-socket insertion grooves 420 of the upper plate 410, the lamp tube holders 430 are disposed on the alignment plate 400 on a level with the power supply sockets 200. Thus, the lamp tube holders 430 and the power supply sockets 200 are less likely to be displaced even when an external shock is applied thereto, and, thus, the connections between the lamp tubes 111 and the electrodes 112 are less likely to crack. Therefore, it is possible to reduce the probability of the breakdown of the lamps 110. A plurality of alignment plate tightening coupling element insertion grooves 440 are formed through the upper plate 410 of the alignment plate 400. The alignment plate 400 may be coupled to the bottom plate 151 by a plurality of tightening coupling elements 155 such as, for example, screws.

In one embodiment, the housings 450 protrude downward from the upper plate 410. As many housings 450 as there are power supply sockets 200 are provided. The housings 450 are respectively inserted into the openings 152 of the bottom chassis 150, and are thus disposed below the bottom plate 151. A plurality of alignment-plate coupling protrusions 460 are respectively formed on the housings 450. The alignment-plate coupling protrusions 460 are used to couple the alignment plate 400 to the bottom plate 151. A plurality of inverter-power-supply grooves 470 are respectively formed on the housings 450 below the alignment-plate coupling protrusions 460. The power supply sockets 200 can be fixed to the bottom plate 151 by pressing down the power supply sockets 200 on the bottom plate 151 without the need to turn the bottom chassis 150 upside down. Therefore, it is possible to simplify the manufacture of a backlight assembly, and reduce the time it takes to assemble the backlight assembly.

In one embodiment, referring to FIGS. 1, 4, and 5, the power-supply-socket insertion grooves 420 extend from the upper plate 410 to the inner bottoms of the respective housings 450. Each of the power-supply-socket insertion grooves 420 includes a first-plate insertion groove 420b into which a first plate 220 is inserted, a second-plate insertion groove 420a into which a second plate 210 is inserted, a third-plate insertion groove 420c into which a third plate is inserted, and an inverter-guide-plate insertion groove 420d into which an inverter guide plate 270 is inserted. A plurality of power-supply-socket supporters 425 are respectively formed in the power-supply-socket insertion grooves 420. The first, second, and third plates 220, 210, and 230 of each of the power supply sockets 200 are supported by a corresponding power-supply-socket supporter 425. The first, second, and third plates 220, 210, and 230 and the inverter guide plate 270 of each of the power supply sockets 200 may respectively fit tight in the first, second, and third-plate insertion grooves 420b, 420b, and 420c and the inverter-guide-plate insertion groove 420d of a corresponding power-supply-socket insertion groove 420. For this, the alignment plate 400 may include an elastic element, for example, silicon-based rubber. Alternatively, a plurality of coupling grooves (not shown) may be formed in the power-supply-socket insertion grooves 420, respectively. In this case, the coupling grooves may be engaged by the respective power-supply-socket coupling protrusions 260 of each of the power supply sockets 200.

Figure 7:
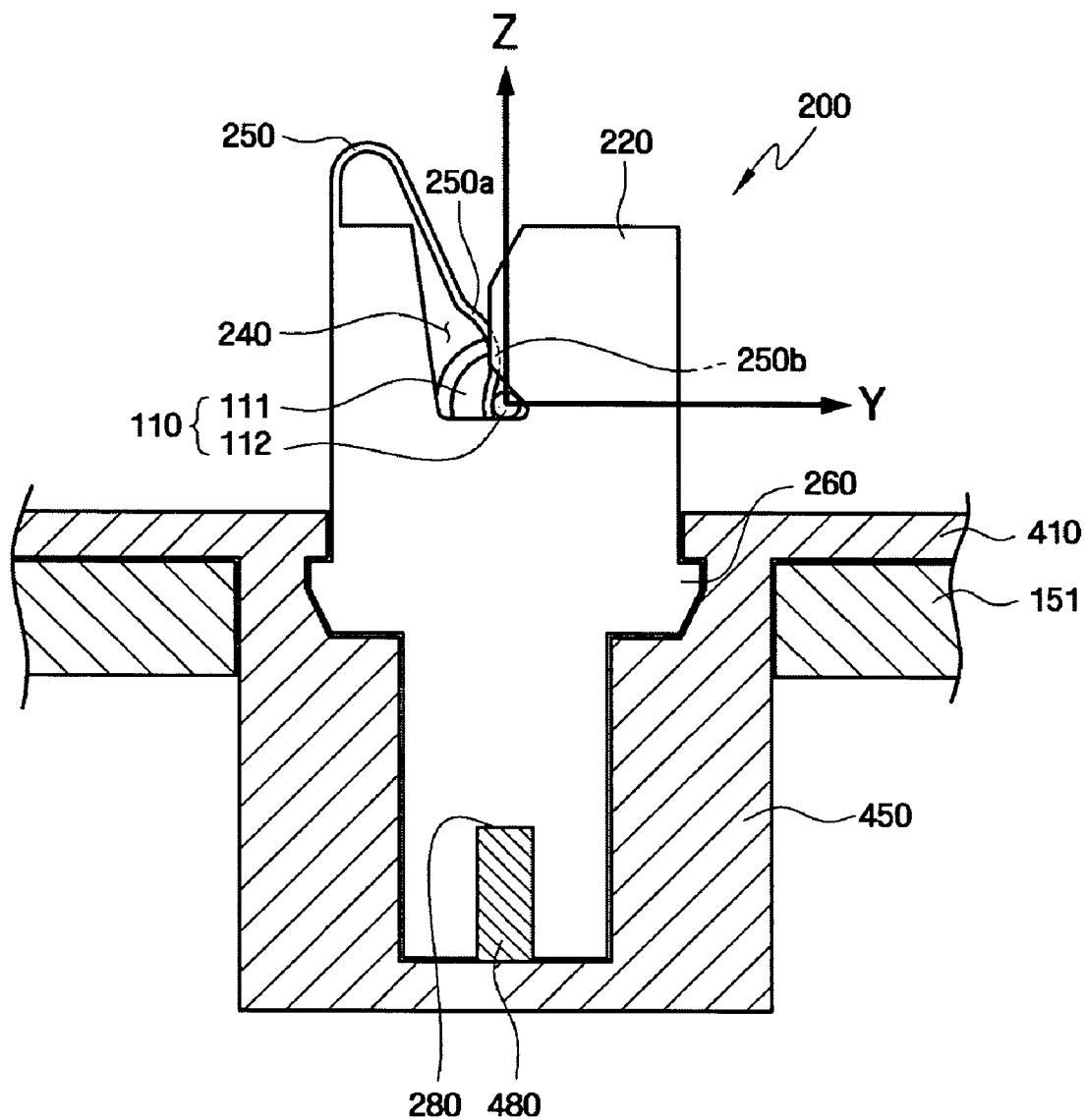
FIG. 7 is a cross-sectional view of the backlight assembly as shown in FIG. 1, taken along line B-B' of FIG. 6.

In one implementation, the connections between the elements of the backlight assembly as shown in FIG. 1 will hereinafter be described in detail with reference to FIGS. 7 through 9. FIG. 7 is a cross-sectional view of the backlight assembly as shown in FIG. 1, taken along line B-B' of FIG. 6, FIG. 8 is a perspective view showing the connection between the power supply sockets 200 and an inverter 500, and FIG. 9 is a cross-sectional view of the backlight assembly as shown in FIG. 1, taken along line C-C' of FIG. 6.

Referring to FIG. 7, the upper plate 410 of the alignment plate 400 of FIG. 4 is disposed on and supported by the bottom plate 151. A housing 450 penetrates the bottom plate 151 and protrudes downward beyond the bottom plate 151. A power supply socket 200 is inserted into and fixed to the alignment plate 400. In this case, a power-supply-socket fixing protrusion 480 engages a power-supply-socket fixing groove 280, and a pair of power-supply-socket coupling protrusions 260 engage respectively corresponding coupling grooves of the alignment plate 400.

In one embodiment, as follows, a process of fixing a lamp 110 to a power supply socket 200 will be described in detail with reference to FIG. 7. Referring to FIG. 7, an electrode 112 of a lamp 110 is introduced between a plate spring 250 and the opening of a first guide groove 240 by an external force applied along a z-direction. In order to facilitate the introduction of the electrode 112, the plate spring 250 may have a concave surface 250a, as described above. The lamp 110 can be easily introduced into and fixed to the power supply socket 200 simply by pressing the lamp 110 in the z-direction. Thus, it is easy to assemble the lamp 110. Once the electrode 112 is introduced into the first guide groove 240, an external force is applied to the electrode 112 in an y-direction by the plate spring 250. Accordingly, the electrode 112 is placed in contact with the end of an inner portion of the first guide groove 240. Since the first guide groove 240 is, for example, L-shaped, the electrode 112 can be prevented from being easily detached from the power supply socket 200. The electrode 112 forms a plurality of contacts with a conductive material. For example, the electrode 112 forms a line contact with a convex surface 250b of the plate spring 250, forms a point contact with the first guide groove 240, and forms a point contact with a second guide groove (not shown). Thus, the electrode 112 can be electrically stabilized.

Figure 8:
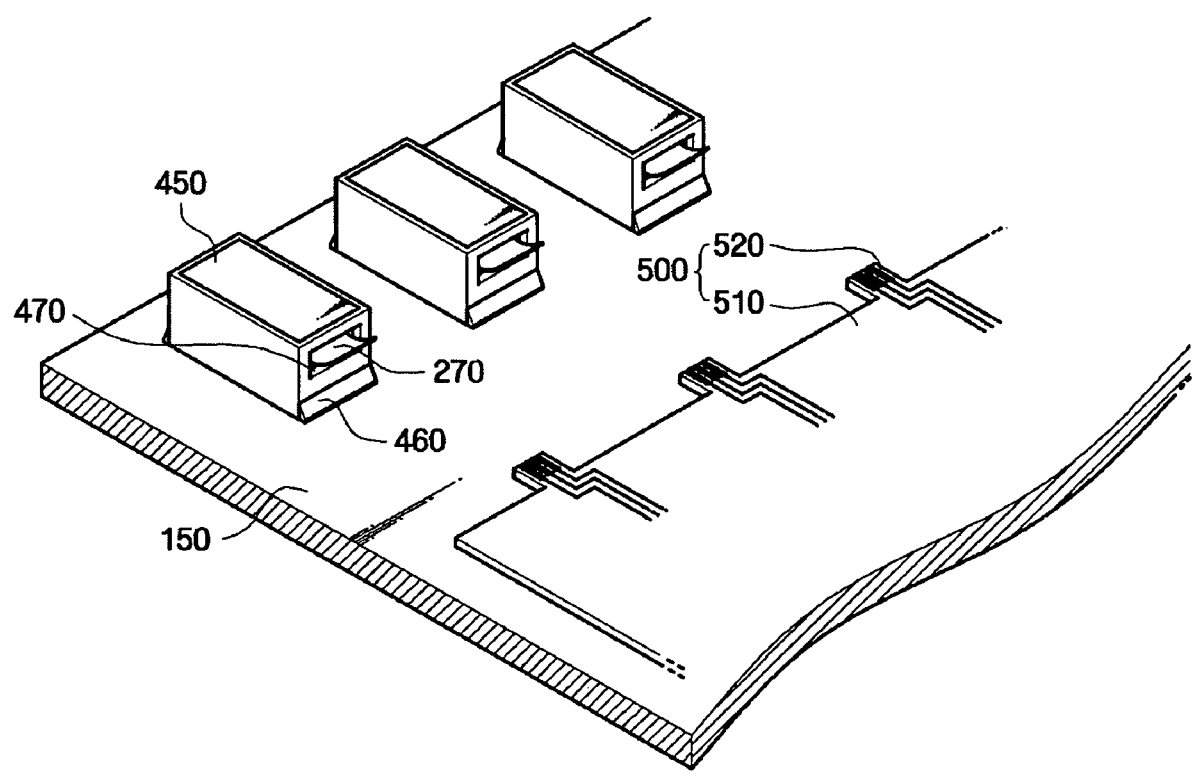
FIG. 8 is a perspective view showing the connection between the power supply socket as shown in FIG. 2 and an inverter.
Figure 9:
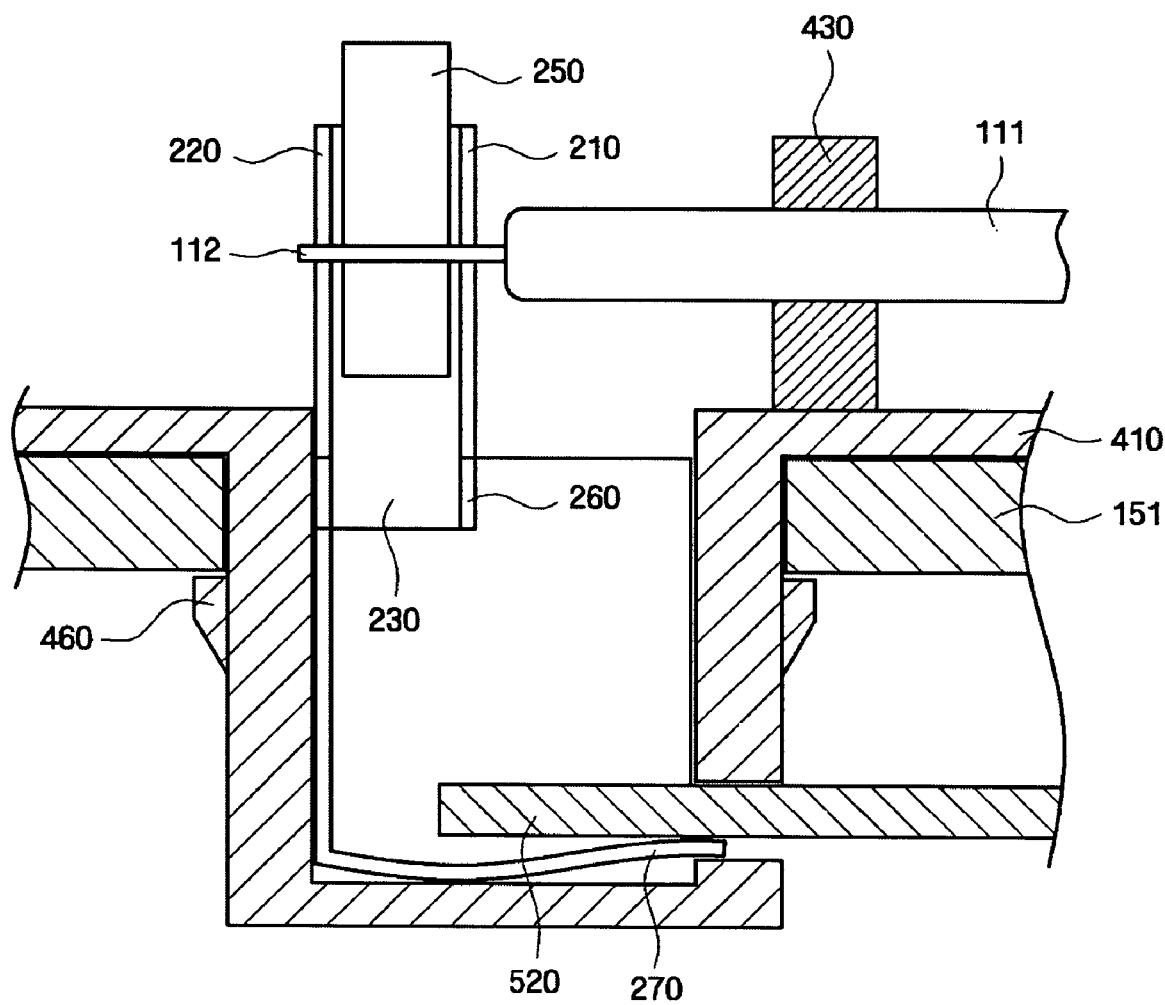
FIG. 9 is a cross-sectional view of the backlight assembly as shown in FIG. 1, taken along line C-C' of FIG. 6.

In one embodiment, referring to FIGS. 8 and 9, a plurality of housings 450 protrude beyond the bottom of the bottom plate 151. A plurality of alignment-plate coupling protrusions 460 contact the bottom of the bottom plate 151 so that the alignment plate 400 can be firmly fixed onto the bottom chassis 150. A plurality of inverter guide plates 270 is respectively disposed in a plurality of inverter-power-supply grooves 470. The inverter 500 is disposed on the bottom of the bottom plate 151. A plurality of inverter power supplies 520 protrude from an inverter circuit board 510. The inverter power supplies 520 respectively contact the inverter guide plates 270 and apply an external power supply voltage. Each of the inverter guide plates 270 may have a curved surface in order to place the inverter power supplies 520 in firm contact with the respective inverter guide plates 270. The inverter 500 may be soldered to the power supply sockets 200 of FIG. 1 so that the inverter 500 can be electrically connected to the power supply sockets 200. Each of the inverter power supplies 520 may include a plurality of power supply lines which are provided on one side of the inverter 500 and a connector which is provided at the ends of the power supply lines. The inverter power supplies 520 may be electrically connected to the respective inverter guide plates 270.

The performance of an LCD including the backlight assembly as shown in FIG. 1 will hereinafter be described in detail with reference to FIG. 10. As indicated above, FIG. 10 is a graph showing luminance measurements of an LCD including the backlight assembly as shown in FIG. 1.

Figure 10:
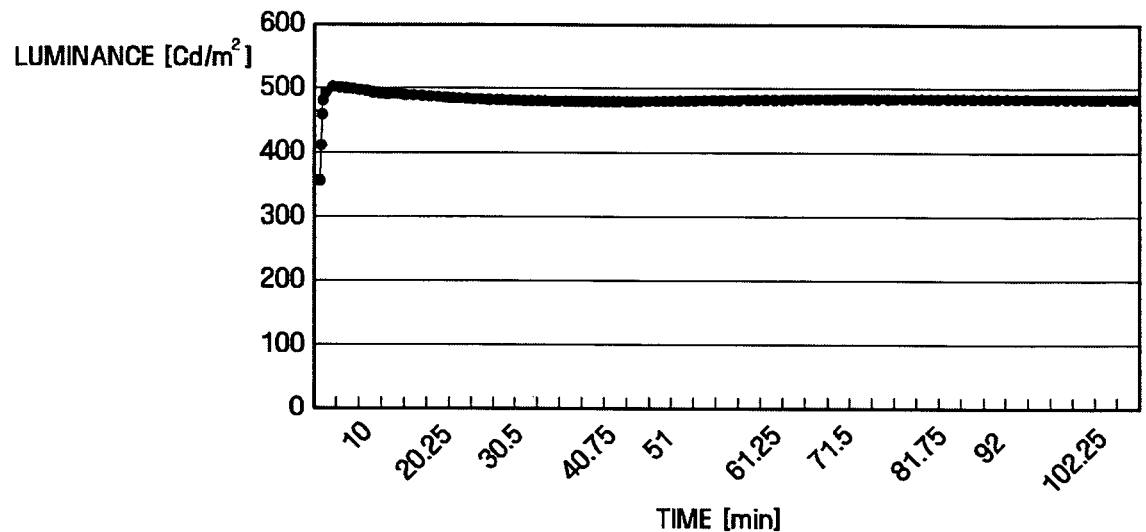
FIG. 10 is a graph showing luminance measurements of a liquid crystal display (LCD) including the backlight assembly as shown in FIG. 1.

In one embodiment, referring to FIG. 10, the LCD including the backlight assembly as shown in FIG. 1 has an average luminance of about 485 cd/m$^2$, which is almost the same level as that of typical LCDs. The temperature of the LCD including the backlight assembly as shown in FIG. 1 was measured with an infrared (IR) thermometer after driving the corresponding LCD at room temperature for about two hours. The results of the measurement indicate that the highest temperature of the LCD including the backlight assembly as shown in FIG. 1 was about 42.2° C. (i.e., degrees Celsius), and that the temperature of a middle part of the LCD including the backlight assembly as shown in FIG. 1 was about 38.3° C. Given that the highest temperature of an LCD having a conventional backlight assembly is about 42.3° C., and that the temperature of a middle part of the conventional LCD is about 39.1° C., the temperature characteristic of the LCD including the backlight assembly as shown in FIG. 1 are improved over those of an LCD having a conventional backlight assembly.

Figure 11:
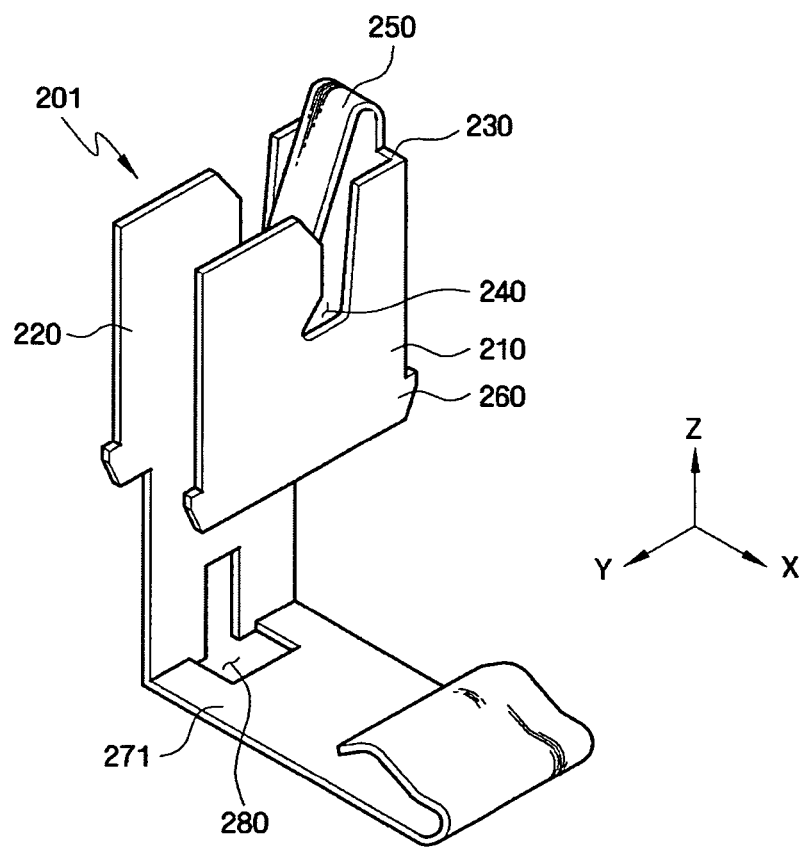
FIG. 11 is a perspective view of an embodiment of the power supply socket as shown in FIG. 2.
Figure 12:
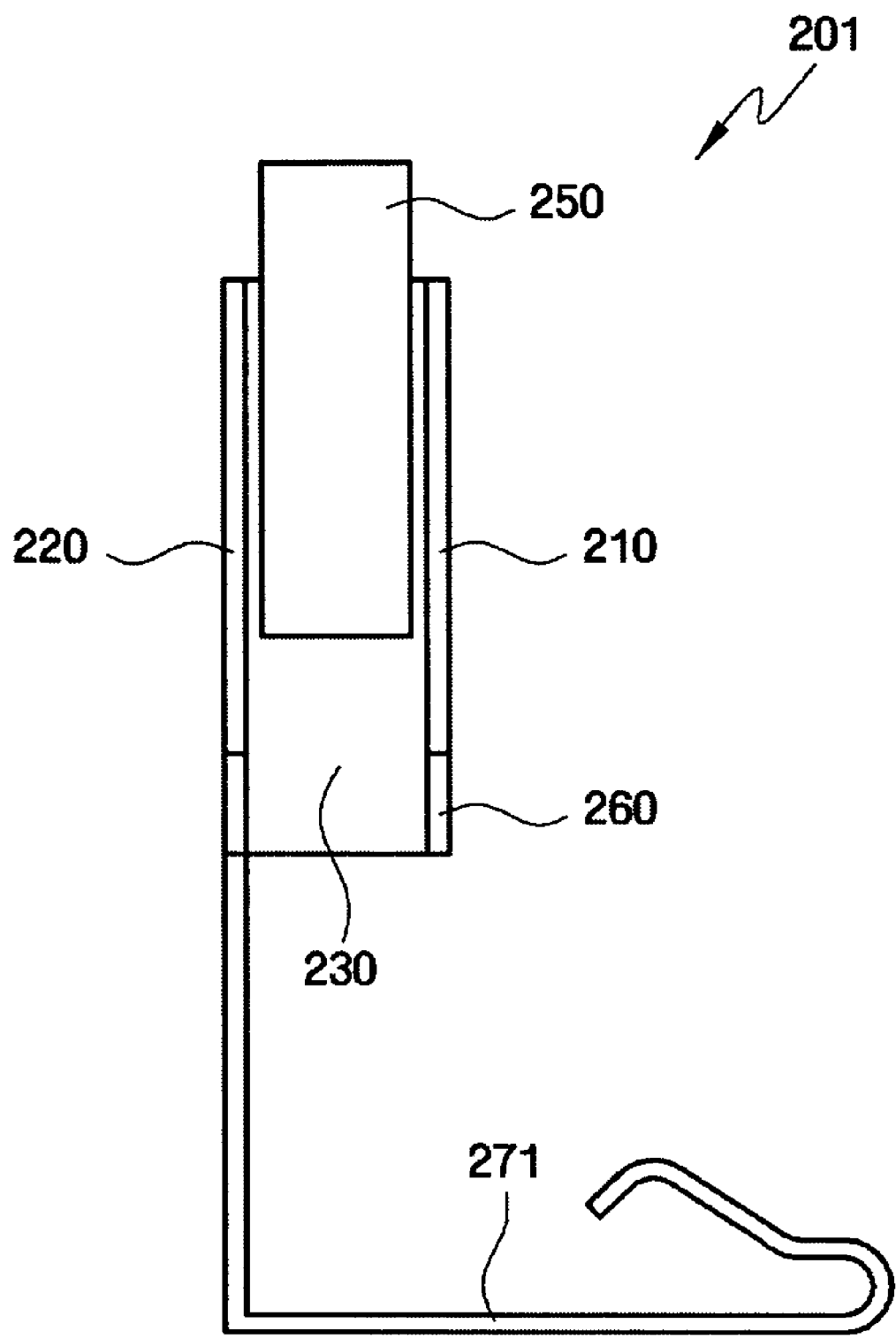
FIG. 12 is a side view of the power supply socket as shown in FIG. 11, as seen from the y-direction.

An embodiment of the power supply socket 200 as shown in FIG. 2 will hereinafter be described in detail with reference to FIGS. 11 and 12. FIG. 11 is a perspective view of an embodiment of the power supply socket 200 as shown in FIG. 2, i.e., a power supply socket 201, and FIG. 12 is a side view of the power supply socket 201 as shown in FIG. 11, as seen from an y-direction. In FIGS. 2, 11 and 12, like reference numerals represent like elements, and, thus, detailed descriptions thereof have been omitted.

In one embodiment, referring to FIGS. 11 and 12, the power supply socket 201 is substantially the same as the power supply socket 200 as shown in FIG. 2 except for the shape of an inverter guide plate 271. In the embodiment of FIGS. 11 and 12, like in the embodiment of FIG. 2, a first plate 220 extends longer than a second plate 210 and protrudes downward beyond a bottom chassis (not shown). The inverter guide plate 271 perpendicularly intersects the second plate 210. An end portion of the inverter guide plate 271 is bent over itself. The bent portion of the inverter guide plate 271 forms a curved surface which helps the inverter guide plate 271 to firmly contact an inverter power supply (not shown).

Figure 13:
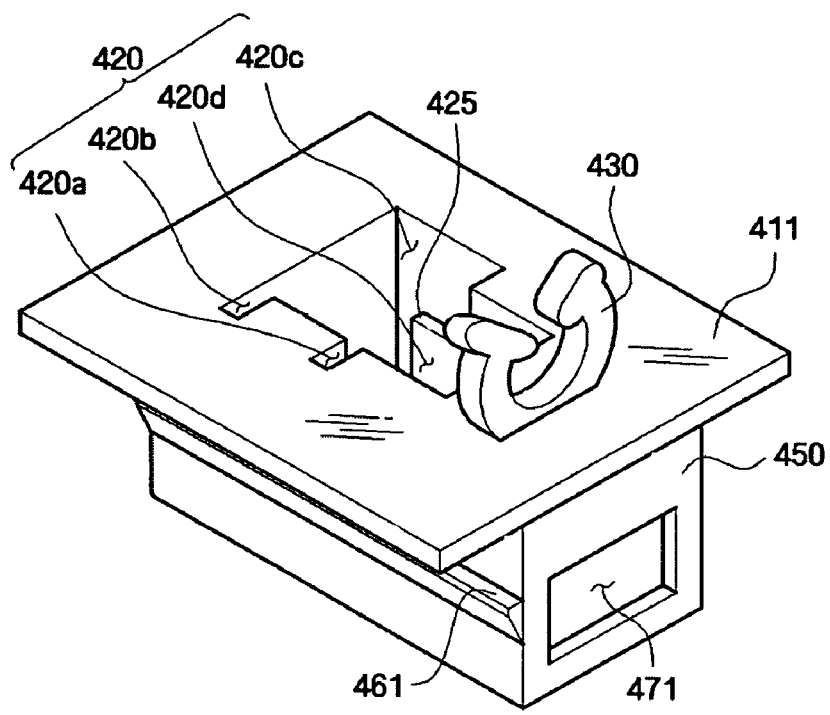
FIG. 13 is a perspective view of an embodiment of the alignment plate as shown in FIG. 1.

An embodiment of the alignment plate 400 as shown in FIG. 1 will hereinafter be described in detail with reference to FIGS. 13 and 14. FIG. 13 is a perspective view of an embodiment of the alignment plate 400 as shown in FIG. 1, i.e., an alignment plate 401, and FIG. 14 is a perspective view showing the connection between the alignment plate 401 as shown in FIG. 13 and the power supply socket 201 as shown in FIG. 12.

In one embodiment, referring to FIG. 13, as many alignment plates 401 as there are lamps (not shown) may be provided. The alignment plate 401 includes an upper plate 411 which is disposed on a bottom plate (not shown) of a bottom chassis (not shown) and covers an alignment plate insertion groove (not shown). That is, the alignment plate 401 is arranged for each alignment plate insertion groove. A power-supply-socket insertion groove 420 is formed in a housing 450 and extends from the top to the inner bottom of the housing 450. A lamp tube holder 430 is disposed on the upper plate 411. An inverter power supply groove 471 is formed through a lateral sidewall of the housing 450. The inverter guide plate 271 as shown in FIG. 12 may contact an inverter power supply (not shown) through the inverter power supply groove 471.

Figure 14:
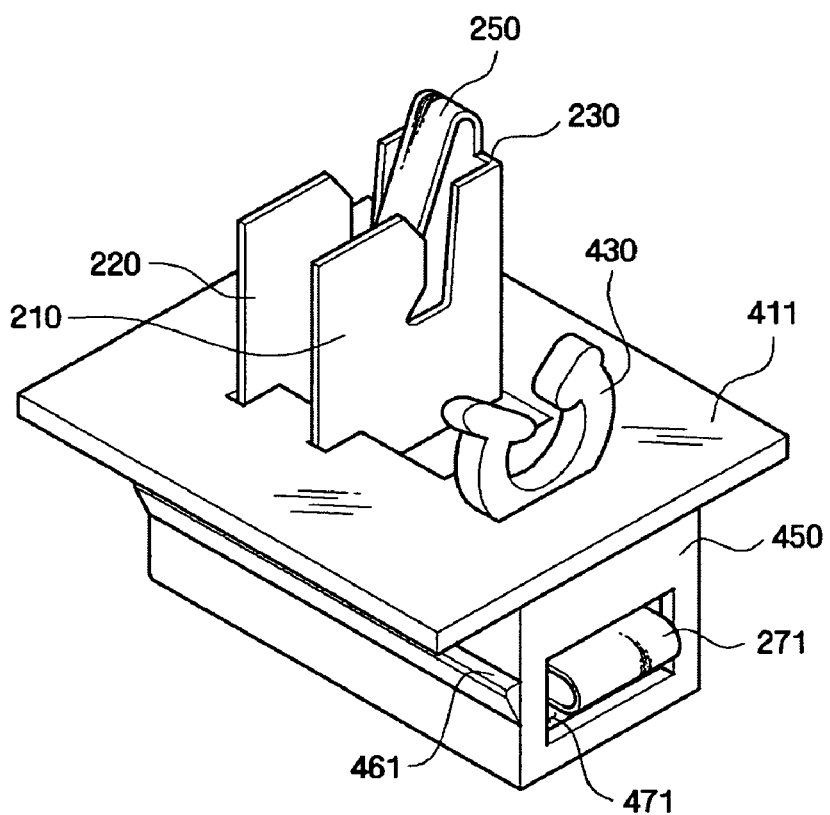
FIG. 14 is a perspective view showing the connection between the alignment plate as shown in FIG. 13 and the power supply socket as shown in FIG. 12.

In one embodiment, referring to FIG. 14, the power-supply-socket insertion groove 420 includes first, second, and third-plate insertion grooves 420b, 420a, and 420c into which first, second, and third plates 220, 210 and 230 are respectively inserted and an inverter-guide insertion groove 420d into which the inverter guide plate 271 is inserted. Since the inverter guide plate 271 of the alignment plate 401 has a bent portion, the inverter-power-supply groove 471 is wider than the inverter-power-supply grooves 470 of the alignment plate 400. Thus, a pair of alignment-plate coupling protrusions 461 may be respectively formed on both sidewalls of the housing 450.

Figure 15:
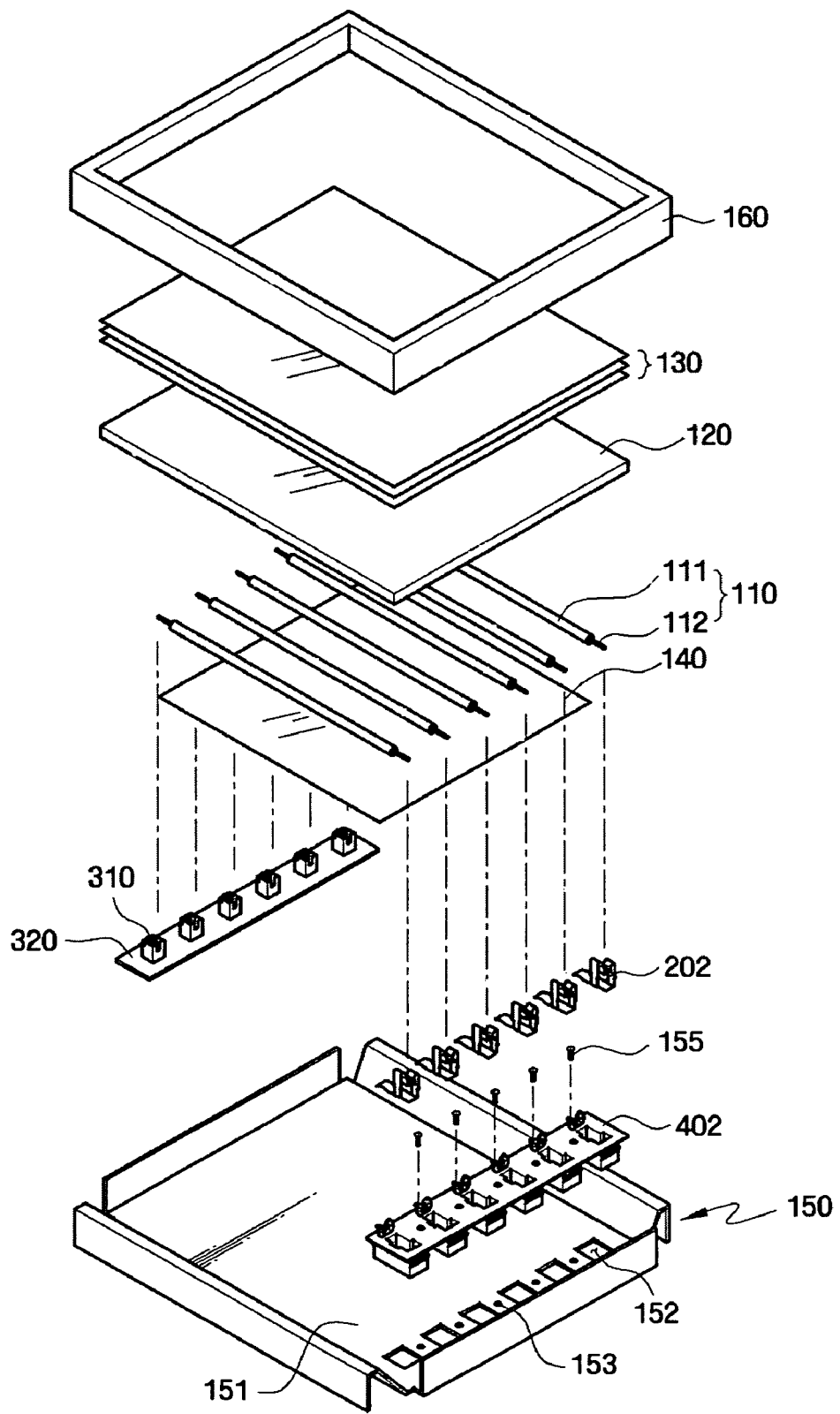
FIG. 15 is an exploded perspective view of a backlight assembly according to another embodiment of the present invention.
Figure 16:
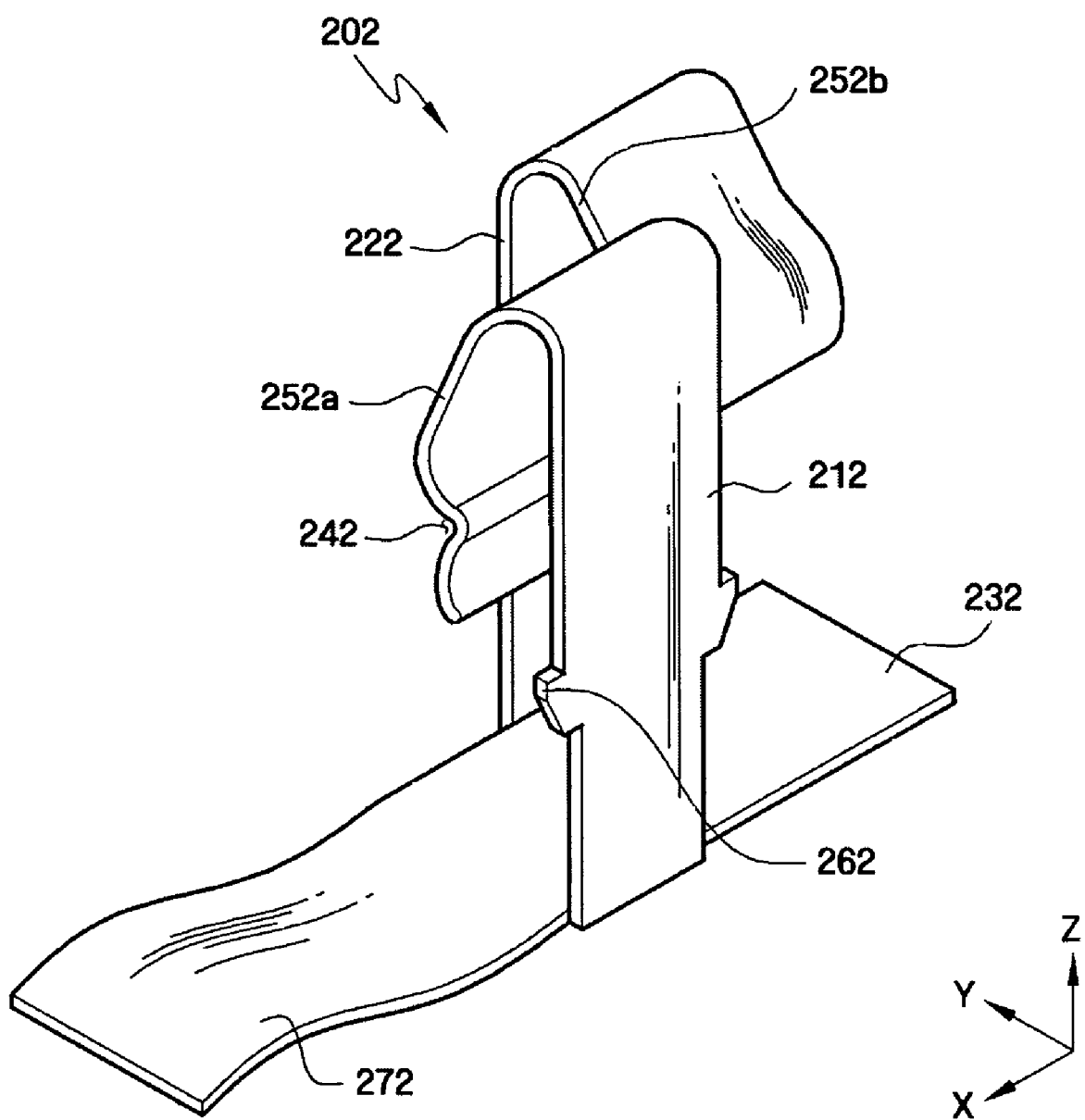
FIG. 16 is a perspective view of the power supply socket as shown in FIG. 15.
Figure 17A:
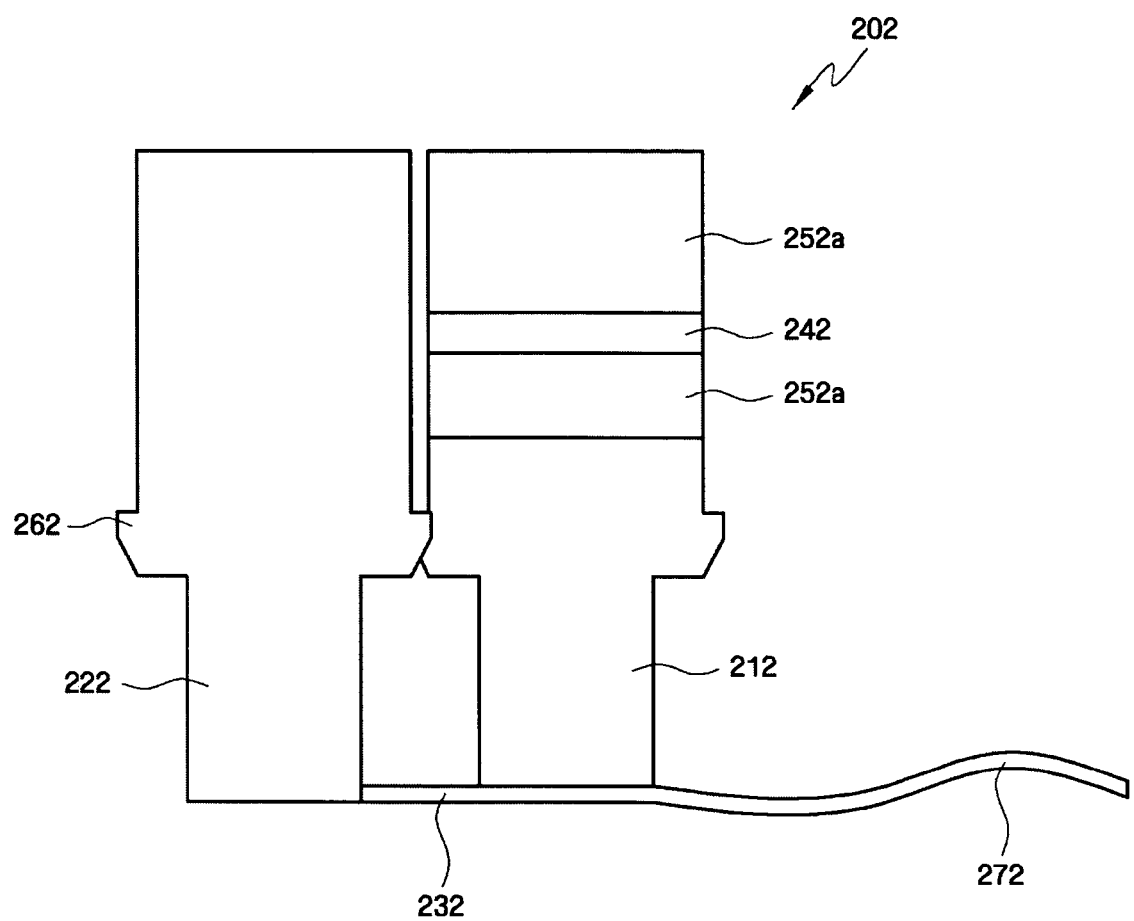
FIG. 17A is a side view of the power supply socket as shown in FIG. 16, as seen from the y-direction.
Figure 17B:
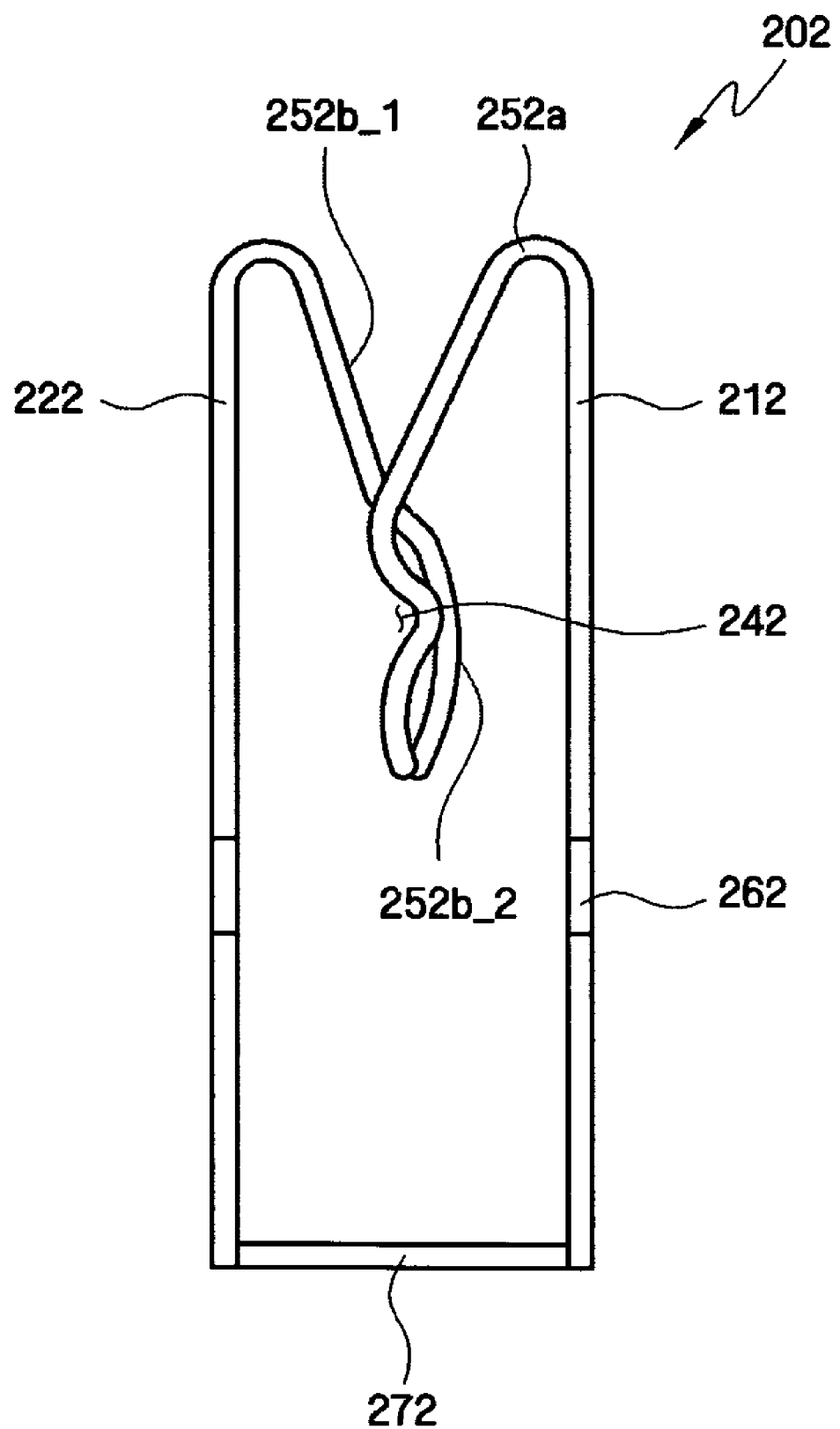
FIG. 17B is a top view of the power supply socket as shown in FIG. 16, as seen from the x-direction.
Figure 17C:
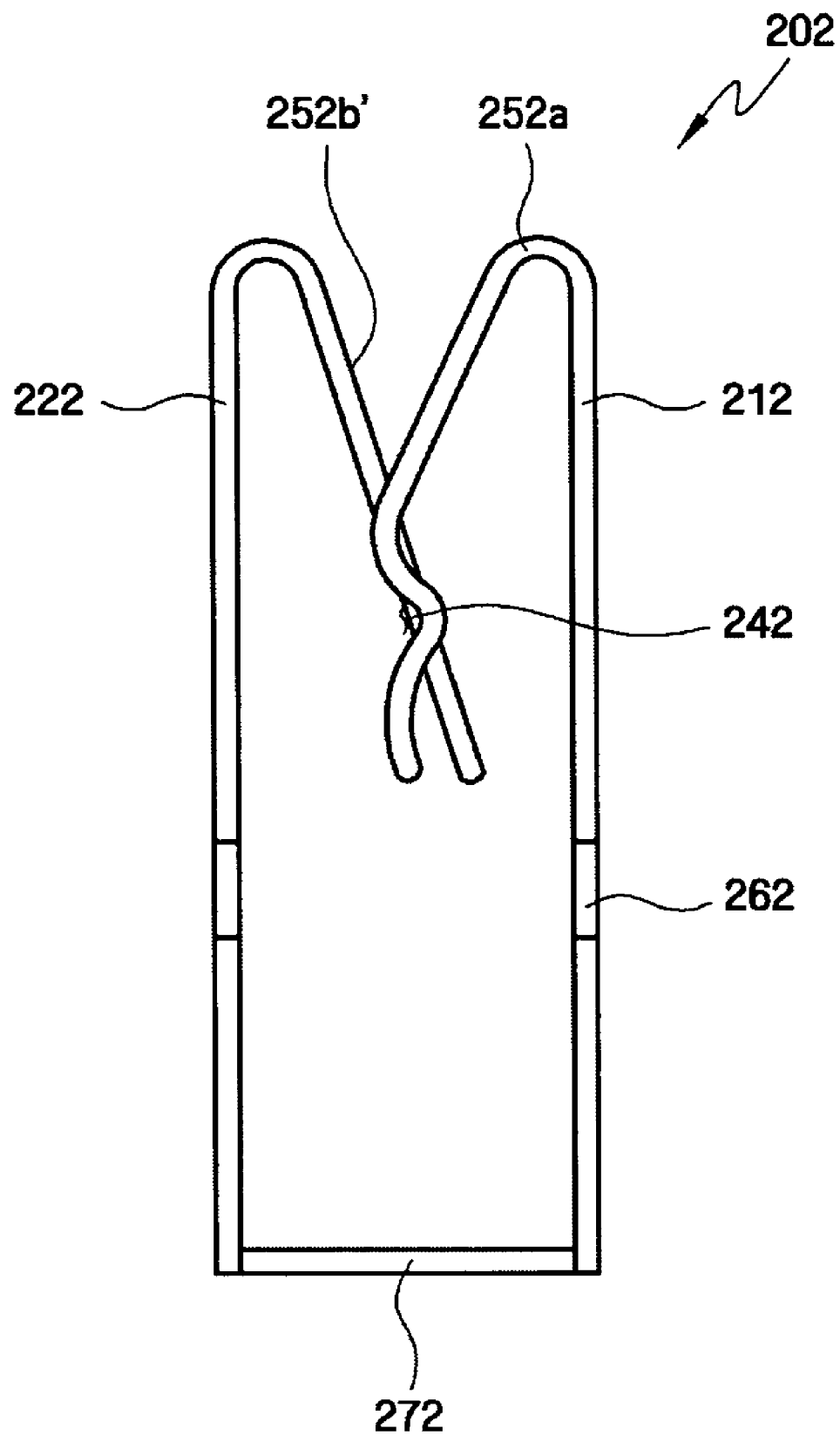
FIG. 17C is a top view of an embodiment of the power supply socket as shown in FIG. 17B, as seen from the x-direction.

A backlight assembly according to another embodiment of the present invention and a plurality of power supply sockets in the backlight assembly will hereinafter be described in detail with reference to FIGS. 15 through 17C. FIG. 15 is an exploded perspective view of a backlight assembly according to another embodiment of the present invention, FIG. 16 is a perspective view of a power supply socket 202 as shown in FIG. 15, FIG. 17A is a side view of the power supply socket 202 as shown in FIG. 16, as seen from the y-direction, FIG. 17B is a top view of the power supply socket 202 as shown in FIG. 16, as seen from the x-direction, and FIG. 17C is a top view of an embodiment of the power supply socket 202 as shown in FIG. 17B, as seen from the x-direction.

In one embodiment, referring to FIGS. 15 through 17C, a power supply socket 202 may include a power-supply-socket bottom plate 232, a first plate 222 which is disposed at one side of the power-supply-socket bottom plate 232, is formed with the power-supply-socket bottom plate 232 into one body and substantially perpendicularly intersects the power-supply-socket bottom plate 232, and a second plate 212 which is disposed at the other side of the power-supply-socket bottom plate 232, is formed with the power-supply-socket bottom plate 232 into one body, substantially perpendicularly intersects the power-supply-socket bottom plate 232 and does not overlap the first plate 222. The power-supply-socket bottom plate 232 extends in the x-direction, and the first plate 222 and the second plate 212 extend in the z-direction. A first plate spring 252b extends from the first plate 222, and a second plate spring 252a extends from the second plate 212. A pair of power-supply-socket coupling protrusions 262 is respectively formed on both sides of the first plate 222. Likewise, a pair of power-supply-socket coupling protrusions 262 is respectively formed on both sides of the second plate 221. Due to the power-supply-socket coupling protrusions 262 of each of the first and second plates 222 and 221, the power supply socket 200 can be easily coupled to an alignment plate (not shown).

In one embodiment, the first plate spring 252b applies an external force to an electrode 112 of a lamp 110 in a first direction (e.g., −y-direction), and the second plate spring 252a applies an external force in a second direction (e.g., y-direction) which is the opposite of the first direction. The first plate spring 252b and the second plate spring 252a may be formed of a conductive material, and may be incorporated into one body. A guide groove 242 may be formed on at least one of the first plate spring 252b and the second plate spring 252a. For example, the guide groove 242 may be formed on the second plate spring 252b. The guide groove 242 helps the electrode 112, which extends in the x-direction, to be fixed onto the second plate spring 252b. Referring to FIG. 17B, the first plate spring 252b may have a concave surface 252b_1 and a convex surface 252b_2. In order to firmly fix the electrode 112 to the power supply socket 202, the convex surface 252b_2 may be disposed at a location corresponding to the guide groove 242. Alternatively, the first plate spring 252b may have neither a concave surface nor a convex surface, as indicated by a first plate spring 252b' as shown in FIG. 17C. For clarity, however, assume that the first plate spring 252b has both the concave surface 252b_1 and the convex surface 252b_2. As seen from the x-direction, the first plate spring 252b overlap the second plate spring 252b so that the guide groove 242 can be placed in firm contact with the electrode 112. However, as seen from the y-direction, the first plate guide 252b and the second plate spring 252 neither overlap nor contact each other.

In one embodiment, the inverter guide plate 272 extends from the power-supply-socket bottom plate 232 toward the x-direction. The inverter guide plate 272 may have a curved surface so as to be placed in firm contact with an inverter power supply (not shown).

Figure 18:
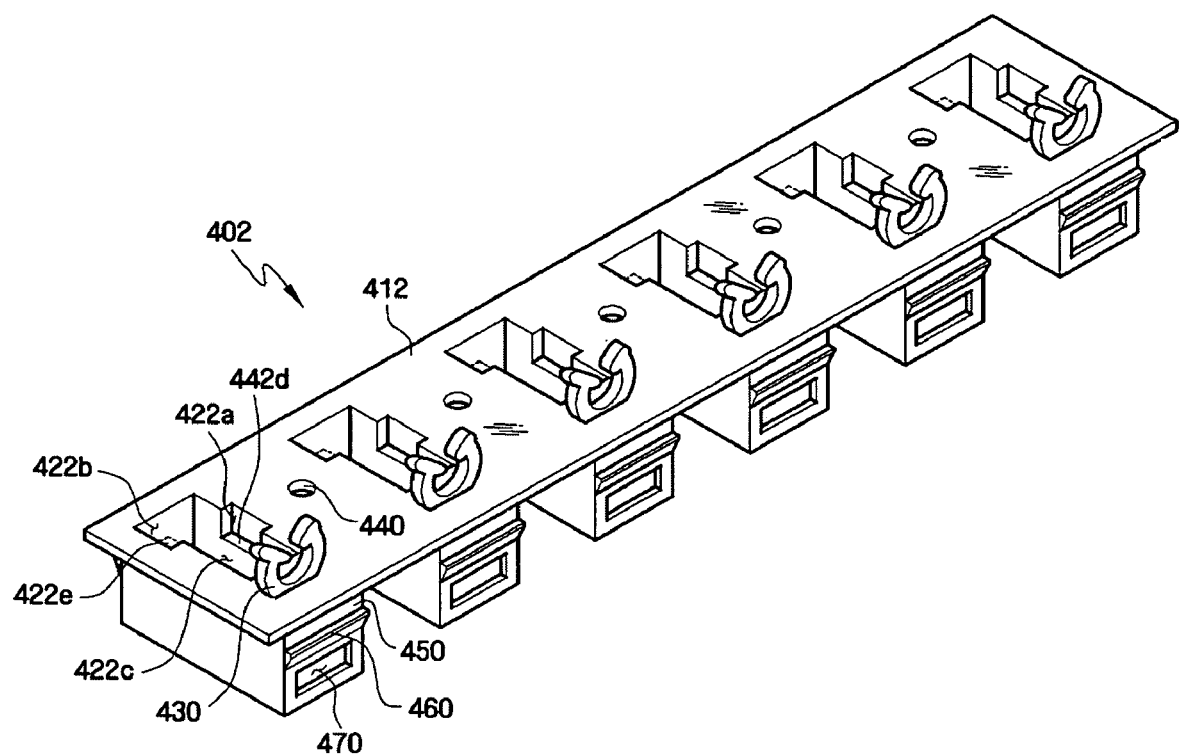
FIG. 18 is a perspective view of the alignment plate as shown in FIG. 15.

It will hereinafter be described in detail how the alignment plate 402 and a plurality of power supply sockets 202 as shown in FIG. 15 are connected with reference to FIGS. 15 and 18 through 20. FIG. 18 is a perspective view of the alignment plate 402 as shown in FIG. 15, FIG. 19 is a perspective view showing the connection between the power supply socket 202 as shown in FIG. 16, the alignment plate 402 as shown in FIG. 18, a plurality of lamps 110 and a bottom chassis 150, and FIG. 20 is a cross-sectional view of the backlight assembly as shown in FIG. 15, taken along line D-D' of FIG. 19.

In one embodiment, referring to FIGS. 15 and 18, the alignment plate 402 includes an upper plate 412 which is disposed on a bottom plate 151 of the bottom chassis 150, and a plurality of housings 450 which protrude downward from the upper plate 412. The housings 450 are respectively inserted into a plurality of openings 152 for the alignment plate 402 so that the housings 450 can protrude beyond the bottom plate 151 of the bottom chassis 150.

In one embodiment, a power-supply-socket insertion groove includes a first-plate insertion groove 422b, a second-plate insertion groove 422a, and a power-supply-socket bottom plate insertion groove 422c. The first-plate insertion groove 422b includes a power-supply-socket supporter 422d, and the second-plate insertion groove 422a includes a power-supply-socket supporter 422e. A first plate 222 and a second plate 221 may be respectively inserted into the first-plate insertion groove 422b and the second-plate insertion groove 422a so that the first plate 222 and the second plate 212 can fit tight in the first-plate insertion groove 422b and the second-plate insertion groove 422a and can be supported by the power-supply-socket supporters 422d and 422d. Similar to the embodiment of FIGS. 1 through 14, in the embodiment of FIGS. 15 and 20, the power-supply-socket coupling protrusions 242 may engage and thus be coupled to respective corresponding grooves (not shown) which are formed in the openings 152 for the alignment plate 402.

Figure 19:
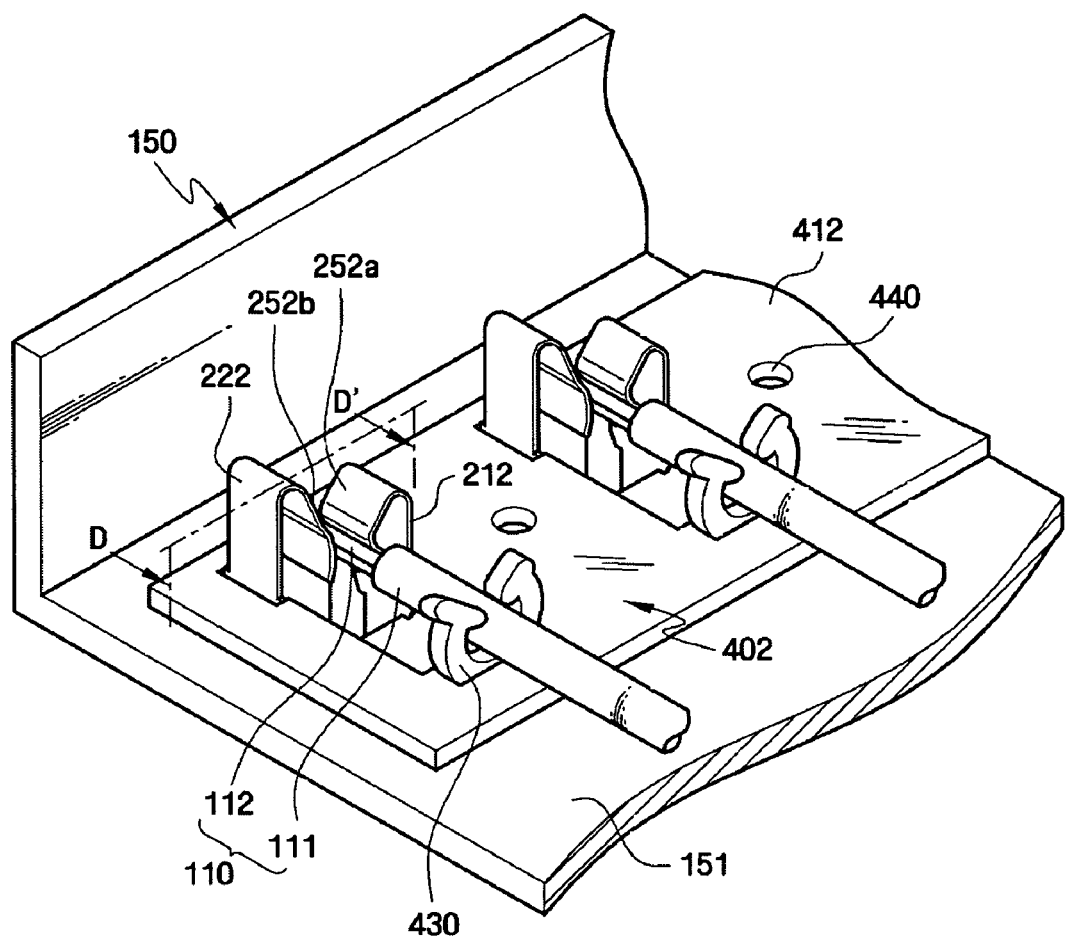
FIG. 19 is a perspective view showing the connection between the power supply socket as shown in FIG. 16, the alignment plate as shown in FIG. 18, a plurality of lamps and a bottom chassis.
Figure 20:
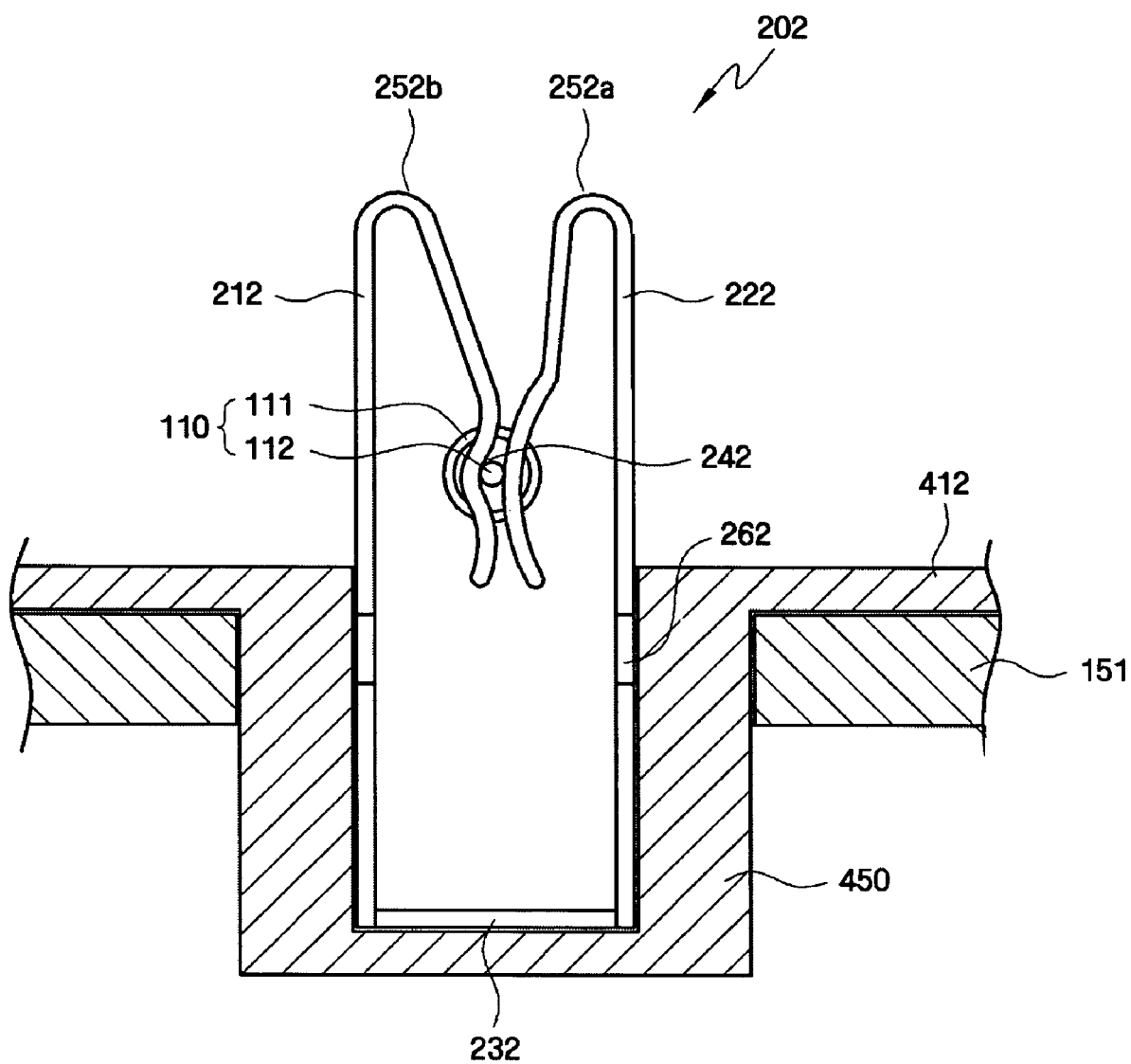
FIG. 20 is a cross-sectional view of the backlight assembly as shown in FIG. 15, taken along line D-D' of FIG. 19.

In one embodiment, referring to FIGS. 19 and 20, a lamp 110 may be fixed in a power supply socket 202 by pressing down the lamp 110 on the upper plate 412 of the alignment plate 402. In this case, an electrode 112 of the lamp 110 is firmly fixed in a guide groove 242 by the first plate spring 252b and the second plate spring 252b which pressurize the electrode 112 in opposite directions. The alignment plate 402 can be easily fixed to the bottom chassis 150 simply by pressing down the alignment plate 402 on the bottom chassis 150.

Figure 21:
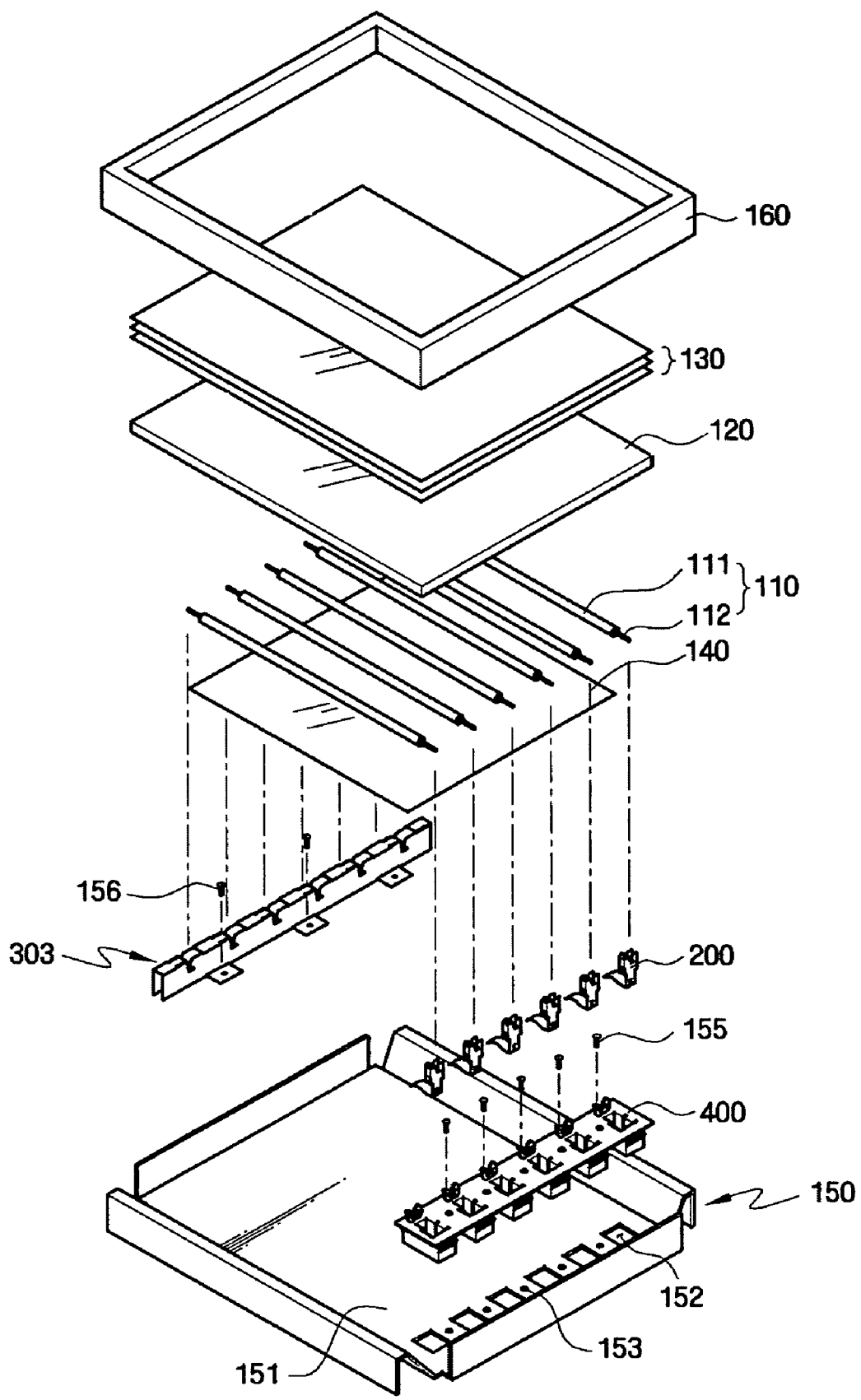
FIG. 21 is an exploded perspective view of a backlight assembly according to another embodiment of the present invention.

A backlight assembly according to another embodiment of the present invention will hereinafter be described in detail with reference to FIGS. 21 through 23. FIG. 21 is an exploded perspective view of a backlight assembly according to another embodiment of the present invention, FIG. 22 is a perspective view of a ground socket 303 as shown in FIG. 21, and FIG. 23 is a bottom view of the ground socket 303, as seen from the x-direction.

In one embodiment, referring to FIG. 21, the backlight assembly may be driven using a single-side driving method. In the single-side driving method, an external power supply voltage is applied only to first ends of a plurality of lamps 110, whereas second ends of the lamps 110 are grounded by a bottom chassis 150.

Figure 22:
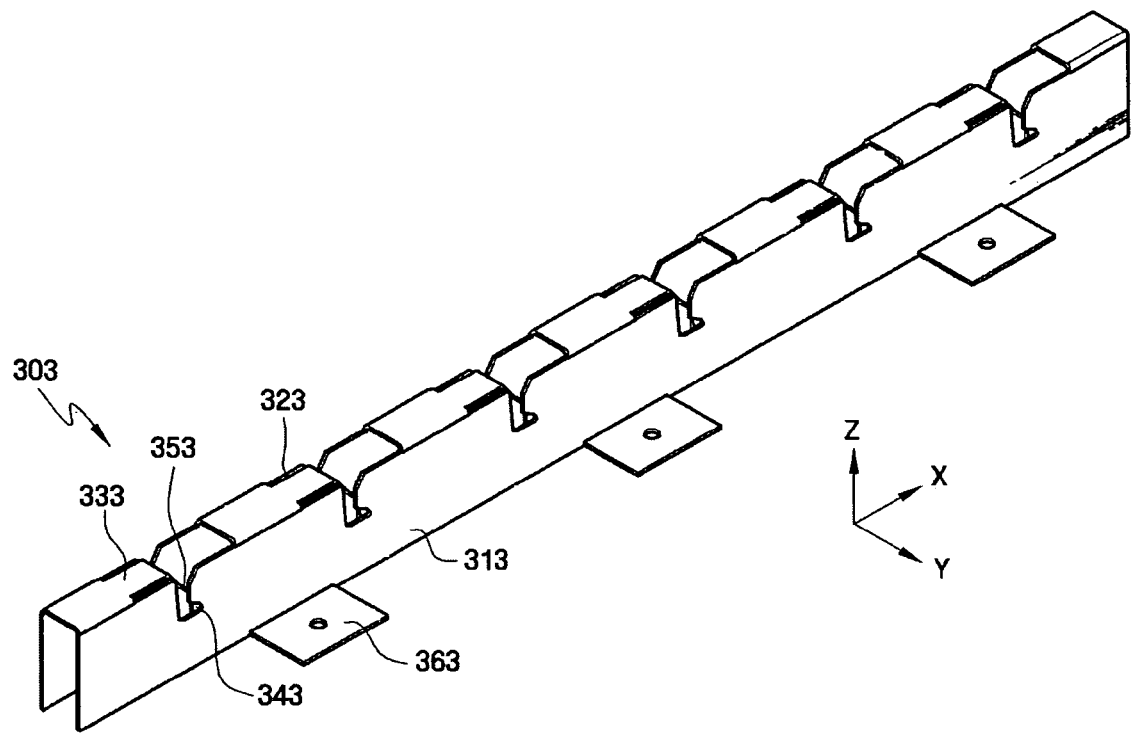
FIG. 22 is a perspective view of a ground socket as shown in FIG. 21.
Figure 23:
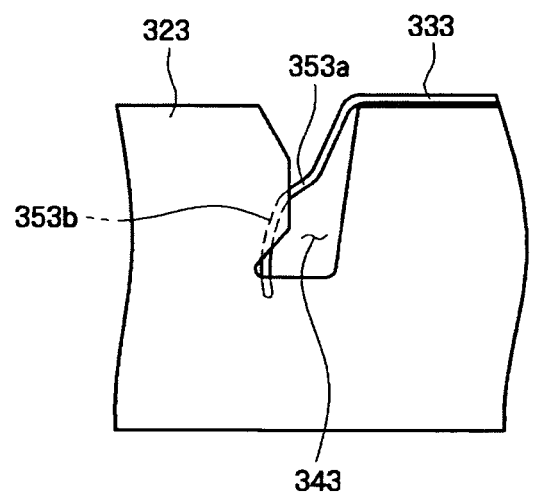
FIG. 23 is a bottom view of the ground socket as shown in FIG. 22, as seen from the x-direction.

In one embodiment, referring to FIGS. 21 through 23, the ground socket 303 grounds the lamps 110. The ground socket 303 includes a first plate 323 having a plurality of first guide grooves 343, and a plurality of plate springs 353 respectively corresponding to the first guide grooves 343. Specifically, the ground socket 303 includes the first plate 323 having the same length as that of a short side of the bottom chassis 150, perpendicularly intersecting a bottom plate 151 of the bottom chassis 150 and extending in the y-direction, a second plate 313 being spaced apart from the first plate 323 and facing the first plate 323, and a plurality of third plates 333 connecting the first plate 323 and the second plate 313 and respectively corresponding to the first guide grooves 343. The first plate 323, the second plate 313, the third plates 333, and the plate springs 353 may be formed of a conductive material, for example, a metal, and may be incorporated into one body. The material and the functions of the ground socket 303 are substantially the same as those of the power supply socket 200 as shown in FIG. 2.

In one embodiment, the second plate 313 includes a plurality of second guide grooves 343 which respectively overlap the first guide grooves 343 of the first plate 323. The first and second guide grooves 343 have substantially the same shape as the first and second guide grooves 240 of the embodiment of FIGS. 1 through 14. Each of the first and second guide grooves 343 has an opening and an inner portion which extends from the opening toward the y-direction. The first and second guide grooves 343 become narrower from the respective openings to the respective inner portions.

In one embodiment, a plurality of fixing plates 363 extend from a lower side of the first plate 323 and a lower side of the second plate 313, respectively. The ground socket 303 is coupled to the bottom plate 151 of the bottom chassis 150 by inserting a plurality of tightening coupling elements 156 into the holes of the fixing plates 363.

In one embodiment, referring to FIGS. 21 and 23, the plate spring 353 extends from the third plate 333, and places an electrode 112 in contact with the inner portions of a first guide groove 343 and a second guide groove 343 by applying an external force to the electrode 112 in the y-direction.

Figure 24:
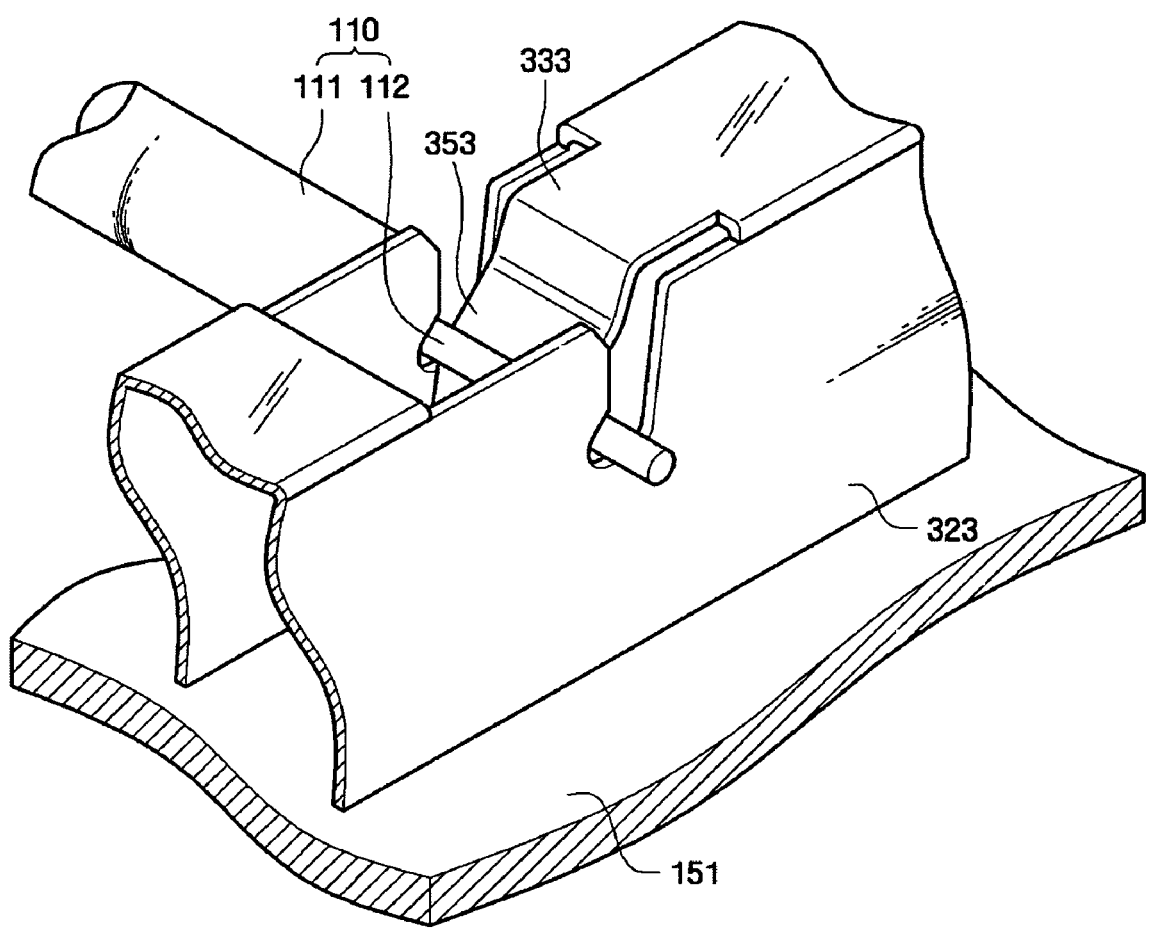
FIG. 24 is a perspective view showing the connection between the ground socket as shown in FIG. 22 and a plurality of lamps.
Figure 25:
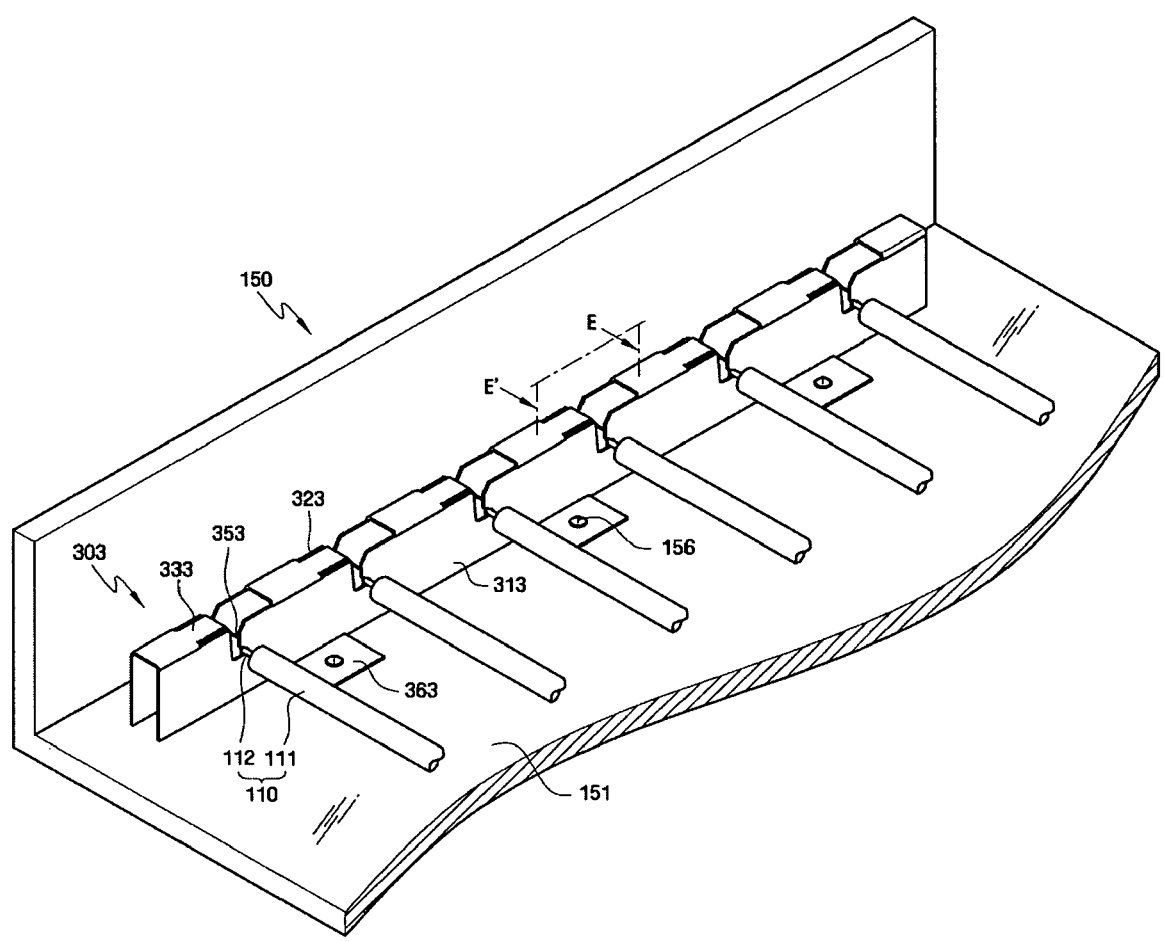
FIG. 25 is a perspective view showing the connection between the ground socket as shown in FIG. 22, the lamps as shown in FIG. 21, and a bottom chassis.
Figure 26A:
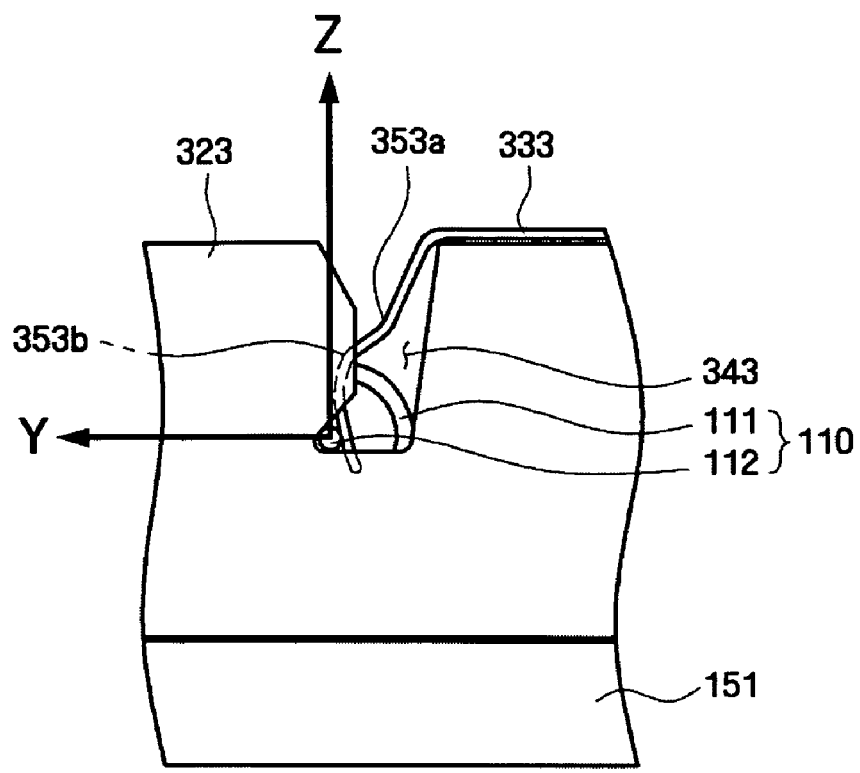
FIG. 26A is a cross-sectional view of the backlight assembly as shown in FIG. 21, taken along line E-E' of FIG. 25.

Hereinafter, the connection between the elements of the backlight assembly as shown in FIG. 21 will be described in detail with reference to FIGS. 24 through 26B. FIG. 24 is a perspective view showing the connection between the ground socket 303 as shown in FIG. 22 and a lamp 110, FIG. 25 is a perspective view showing the connection between the ground socket 303 as shown in FIG. 22, a plurality of lamps 110 and a bottom chassis 150, FIG. 26A is a cross-sectional view of the backlight assembly as shown in FIG. 21 taken along line E-E' of FIG. 25, and FIG. 26B is a cross-sectional view showing the connection between an embodiment of the ground socket 303 as shown in FIG. 22, a lamp 110, and a bottom chassis 150.

Figure 26B:
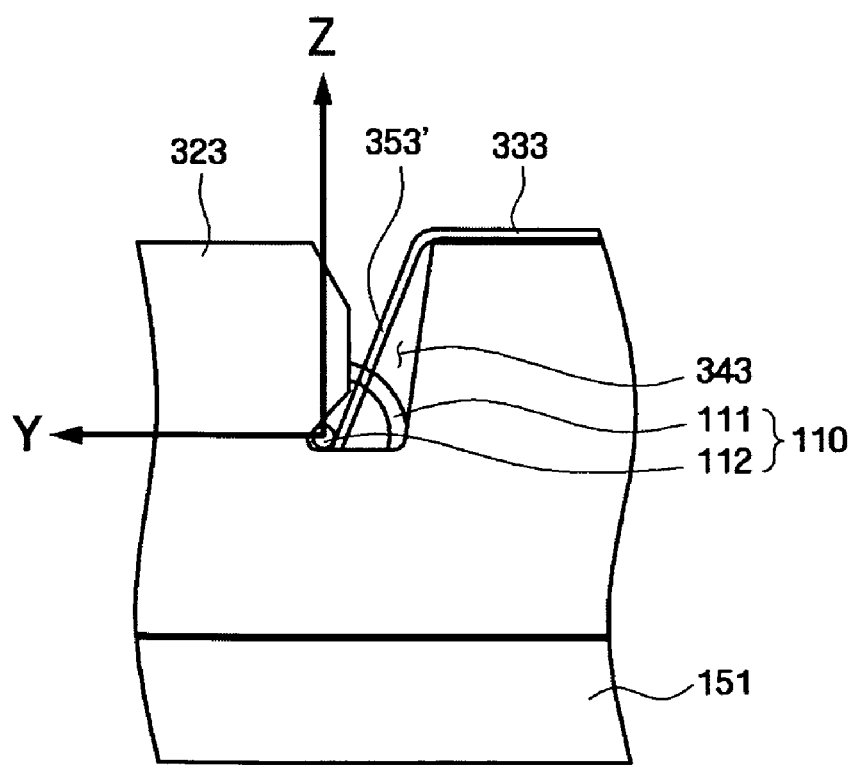
FIG. 26B is a cross-sectional view showing the connection between an embodiment of the ground socket as shown in FIG. 22, a lamp, and a bottom chassis.

In one embodiment, referring to FIGS. 24 through 26B, the ground socket 303 is fixed onto the bottom plate 151 of the bottom chassis 150. A plurality of lamps 110 may be easily fixed in the ground socket 303 by pressurizing the lamps 110, for example, in the z-direction. In one embodiment, referring to FIG. 26A, a plate spring 353 may have a concave surface 353a, which is disposed at a location corresponding to the opening of a first or second guide groove 343, and may thus easily introduce an electrode 112 into the first and second guide grooves 343. The plate spring 353 may also have a convex surface 353b which is disposed at a location corresponding to the end of the inner portion of the first or second guide groove 343. The concave surface 353a and the convex surface 353b of the plate spring 353 may be appropriately deformed so that the plate spring 353 can apply a force of about 3-5 N to an electrode 112. If a force of less than 3 N is applied to an electrode 112, the electrode may be detached from first and second guide grooves 343. In contrast, if a force of more than 5 N is applied to an electrode 112, the electrode 112 may be bent or broken. In order for the plate spring 353 to apply an external force to an electrode 112, the connection between the plate spring 353 and a third plate 333 on which stress is highly likely to be concentrated may be designed to have a curvature radius of about 0.1-0.5. Alternatively, the plate spring 353 may have neither a concave surface nor a convex surface, as indicated by a plate spring 353' as shown in FIG. 26B.

The performance of an LCD including the backlight assembly as shown in FIG. 21 will hereinafter be described in detail with reference to FIG. 27. As indicated above, FIG. 27 is a graph of luminance measurements of an LCD including the backlight assembly as shown in FIG. 21.

Figure 27:
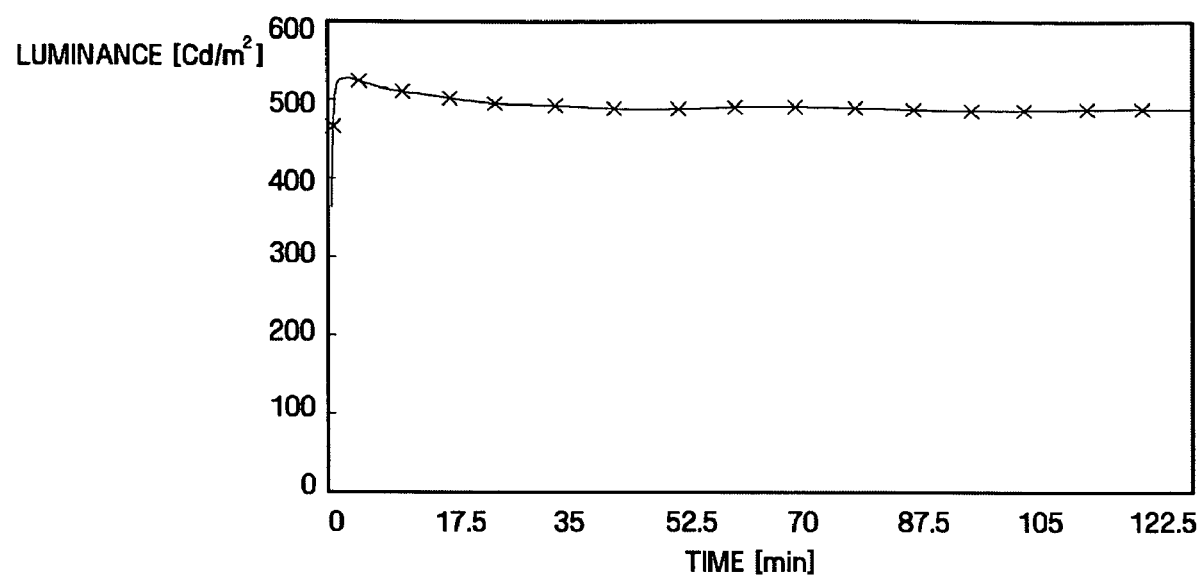
FIG. 27 is a graph showing luminance measurements of an LCD including the backlight assembly as shown in FIG. 21.

In one embodiment, referring to FIG. 27, an LCD including the backlight assembly as shown in FIG. 21 has an average luminance of about 510 cd/m$^2$, which is almost the same level as that of typical LCDs. Temperature measurements of the LCD including the backlight assembly as shown in FIG. 21 indicate that the temperature characteristics of the LCD including the backlight assembly as shown in FIG. 1 are the same as or improved over those of an LCD including a conventional backlight assembly.

As described above, according to an embodiment of the present invention, integral power supply sockets or ground sockets are used to fabricate a backlight assembly. Thus, it is possible to reduce the number of parts and the time it takes to assemble a backlight assembly.

In addition, according to an embodiment of the present invention, the power supply sockets or ground sockets equipped with plate springs or an electrode guides are used to fabricate a backlight assembly. Thus, it is possible to firmly fix lamps in the power supply sockets or ground sockets, and to reduce the possibility of lamps being detached from the power supply sockets or ground sockets or being damaged by an external shock.

Moreover, according to an embodiment of the present invention, the power supply sockets and the alignment plate are directly coupled onto the bottom chassis without the need to turn the bottom chassis over. Thus, it is possible to reduce the time it takes to assemble a backlight assembly.

While the present disclosure of invention has been described with reference to exemplary embodiments thereof, it will be understood by those of ordinary skill in the art in light of the foregoing that various changes in form and details may be made therein without departing from the spirit and scope of the present teachings.

What is claimed is:

1. A backlight assembly comprising:
   a lamp having a lamp tube and an electrode that protrudes beyond either end of the lamp tube;
   a power supply socket having a first plate that includes an electrode entrapping first guide groove through which the electrode is inserted for anti-removal entrapment at an entrapping end portion of the first guide groove, and a plate spring that is disposed on one side of the first plate and fixes the electrode in the first guide groove by pressurizing the electrode toward the entrapping end portion of the first guide groove; and
   a bottom chassis having the lamp and the power supply socket therein,
   wherein the first plate and the plate spring are formed of a conductive material, and wherein the electrode of the lamp can be introduced along a first directed axis during insertion so as to pass between and in contact with the plate spring and a mid-insertion edge portion of the first guide groove during insertion, where the plate spring presses toward a second directed axis different from the first directed axis against the electrode during insertion so as to urge the electrode against the mid-insertion edge portion and where at the end of insertion the electrode is urged by the plate spring into entrapped contact with the entrapping end portion of the first guide groove, said entrapping end portion being offset in the direction of the second directed axis from the mid-insertion edge portion of the first guide groove so as to prevent the electrode from being moved out of the entrapping end portion by movement in only along the first directed axis.

2. The backlight assembly of claim 1, wherein the plate spring comprises a concave surface which is disposed at a location corresponding to an opening of the first guide groove and a convex surface which is disposed at a location corresponding to the entrapping end portion of the first guide groove, the convex surface being oriented to entrap the electrode into the entrapping end portion of the first guide groove.

3. The backlight assembly of claim 1, wherein the plate spring is flat.

4. The backlight assembly of claim 1, wherein the first plate and the plate spring are incorporated into one body.

5. The backlight assembly of claim 4, further comprising a second plate which is disposed apart from and facing the first plate on one side of the plate spring and is spaced apart from the first plate, wherein the second plate comprises a second guide groove that mimics the first guide groove, and is integrally formed with the plate spring.

6. The backlight assembly of claim 5, wherein the first and second guide grooves become narrower from respective corresponding openings to respective corresponding electrode entrapping end portions thereof and the first and second guide grooves bend away from said first directed axis at their corresponding electrode entrapping ends.

7. The backlight assembly of claim 6, wherein the first and second guide grooves are substantially L-shaped or substantially T-shaped.

8. The backlight assembly of claim 5, further comprising a third plate which connects the first and second plates and is formed with the first and second plates in one body, wherein the plate spring extends from the third plate.

9. The backlight assembly of claim 1, further comprising an inverter guide plate which is folded from a lower portion of the first plate and is electrically connected to an inverter, wherein the inverter guide plate has a curved surface via which the inverter guide plate is electrically connected to the inverter.

10. The backlight assembly of claim 1, further comprising an inverter guide plate which is folded from a lower portion of the first plate and is electrically connected to an inverter, wherein the inverter guide plate has a bent end portion via which the inverter guide plate is electrically connected to the inverter.

11. The backlight assembly of claim 1, further comprising an alignment plate into which the power supply socket is inserted, wherein an opening for the alignment plate is formed through a bottom plate of the bottom chassis.

12. A backlight assembly comprising:
a lamp having a lamp tube and an electrode that protrudes beyond either end of the lamp tube;
a power supply socket having a first plate that includes a first guide groove through which the electrode is inserted, and a plate spring that is disposed on one side of the first plate and fixes the electrode in the first guide groove by pressurizing the electrode, wherein the first plate and the plate spring are formed of a conductive material;
a bottom chassis having the lamp and the power supply socket therein, and
an alignment plate into which the power supply socket is inserted, wherein an opening for the alignment plate is formed through a bottom plate of the bottom chassis,
wherein the alignment plate comprises an upper plate, a housing which is disposed on the upper plate and is inserted into the opening for the alignment plate, a power-supply-socket insertion groove which extends from the upper plate to an inner portion of the housing, a lamp tube holder which is formed on a top surface of the upper plate, and an inverter-power-supply groove which is formed through the housing and into which an inverter power supply is inserted, and wherein the power supply socket fits tight in the power-supply-socket insertion groove.

13. A backlight assembly comprising:
a lamp having a lamp tube with ends and an electrode that protrudes beyond either end of the lamp tube;
a ground socket having a first plate that includes an electrode entrapping first guide groove into which the lamp is inserted, the first guide groove being structured so as to provide anti-removal entrapment at an entrapping end portion of the first guide groove, and a plate spring which is disposed on one side of the first plate corresponding to the first guide groove and fixes the electrode in the first guide groove by pressurizing the electrode; and
a bottom chassis having the lamp and the ground socket therein,
wherein the first plate and the plate spring are formed of a conductive material, and
wherein the electrode of the lamp is introduced between the plate spring and the first guide groove and is placed in contact with an end of an inner portion of the first guide groove,
and wherein the electrode of the lamp can be introduced along a first directed axis during insertion into the electrode entrapping first guide groove so as to pass between and in contact with the plate spring and with a mid-insertion edge portion of the first guide groove during the insertion, where the plate spring presses toward a second directed axis different from the first directed axis against the electrode during the insertion so as to thereby urge the electrode against the mid-insertion edge portion and where at an end of the insertion the electrode is entrapped by the entrapping end portion of the first guide groove, said entrapping end portion being offset in the direction of the second directed axis from the mid-insertion edge portion of the first guide grove so as to prevent the electrode from being moved out of the entrapping end portion by movement only along the first directed axis.

14. The backlight assembly of claim 13, wherein the plate spring comprises a concave surface which is disposed at a location corresponding to an opening of the first guide groove, and a convex surface which is disposed at a location corresponding to an inner portion of the first guide groove.

15. The backlight assembly of claim 13, wherein the plate spring is flat.

16. The backlight assembly of claim 13, wherein the first plate and the plate spring are incorporated into one body.

17. The backlight assembly of claim 13, further comprising a second plate which is disposed to face the first plate on one side of the plate spring and is spaced apart from the first plate, wherein the second plate comprises a second guide groove which overlaps the first guide groove, and is integrally formed with the plate spring in one body.

18. The backlight assembly of claim 17, wherein the first and second guide grooves become narrower from respective corresponding openings to respective corresponding inner portions and are bent at the inner portions, and the electrode is inserted through the openings, and wherein the first and second guide grooves are L-shaped or T-shaped.

19. The backlight assembly of claim 17, further comprising a third plate which is disposed above the first and second plates to connect the first and second plates and is formed with the first and second plates in one body, wherein the plate spring extends from the third plate.

20. The backlight assembly of claim 17, further comprising a fixing plate which is folded from a lower portion of the first plate and a lower portion of the second plate, respectively, and fixes the ground socket onto a bottom plate of the bottom chassis.

* * * * *